(12) United States Patent
Homma et al.

(10) Patent No.: US 9,569,427 B2
(45) Date of Patent: Feb. 14, 2017

(54) INTENTION ESTIMATION EQUIPMENT AND INTENTION ESTIMATION SYSTEM

(71) Applicant: Clarion Co., Ltd., Saitama-shi, Saitama (JP)

(72) Inventors: Takeshi Homma, Tokyo (JP); Yasunari Obuchi, Saitama (JP); Kazuaki Shima, Saitama (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 14/969,109

(22) Filed: Dec. 15, 2015

(65) Prior Publication Data

US 2016/0188574 A1  Jun. 30, 2016

(30) Foreign Application Priority Data

Dec. 25, 2014  (JP) ................................. 2014-262090

(51) Int. Cl.
*G06F 17/28* (2006.01)
*G10L 15/18* (2013.01)
(Continued)

(52) U.S. Cl.
CPC ............. *G06F 17/28* (2013.01); *G06F 17/279* (2013.01); *G06F 17/2715* (2013.01); *G06N 99/005* (2013.01); *G10L 15/1822* (2013.01)

(58) Field of Classification Search
USPC ........................ 704/1–10, 231–257, 270, 275
See application file for complete search history.

(56) References Cited

U.S. PATENT DOCUMENTS 6,324,512 B1 * 11/2001 Junqua ............... H04N 5/44543
348/E5.105
7,295,981 B1  11/2007 Gupta et al.
(Continued)

FOREIGN PATENT DOCUMENTS

EP    2 838 085 A1   2/2015
JP    2012-047924 A  3/2012
WO   2013/154010 A1  10/2013

OTHER PUBLICATIONS

Extended European Search Report received in corresponding European Application No. 15200815.7 dated Jun. 21, 2016.
(Continued)

*Primary Examiner* — Abul Azad
(74) *Attorney, Agent, or Firm* — Mattingly & Malur, PC

(57) ABSTRACT

An intention estimation equipment includes: a first training data group; a second training data group; a model creation unit that creates first and second statistical models that estimates an intention of an input text; an error data extraction unit that extracts, from the second training data group, training data corresponding to a text, of which an intention estimation result based on the first and the second statistical models is correct and erroneous, respectively, as error data; an opposite data extraction unit that extracts, from the second training data group, training data that is a cause for an intention estimation result of the error data based on the second statistical model becoming erroneous as opposite data; and a data correction unit that performs correction of the second training data group so that an influence of the error data or of the opposite data on creation of the statistical model is changed.

15 Claims, 16 Drawing Sheets

(51) Int. Cl.
*G06F 17/27* (2006.01)
*G06N 99/00* (2010.01)

(56) References Cited

U.S. PATENT DOCUMENTS

| | | | |
|---|---|---|---|
| 8,726,148 B1 * | 5/2014 | Battilana | G06F 17/273 715/234 |
| 2005/0055210 A1 | 3/2005 | Venkataraman et al. | |
| 2011/0082688 A1 * | 4/2011 | Kim | G06F 17/271 704/9 |
| 2015/0255064 A1 * | 9/2015 | Fujii | G06F 17/2755 704/257 |

OTHER PUBLICATIONS

J. Chu-Carroll et al., "Vector-based Natural Language Call Routing" Association for Computational Linguistics, 1999, pp. 361-388, vol. 25, N0.3.
C. Chelba et al., "Speech Utterance Classification" Pro. of ICASSP, 2003, pp. 280-283.
X. Liu et al. "Paraphrase Features to Improve Natural Language Understanding" Proc. of Interspeech 2013, pp. 3776-3779.

\* cited by examiner

FIG.3

| TEXT | BASIC TRAINING DATA GROUP | | |
|---|---|---|---|
| | CORRECT INTENTION EXPRESSION (TOPIC, SLOT) | PRIORITY | MULTIPLYING FACTOR |
| NEARBY RESTAURANT | PERIPHERY RETRIEVAL, QUERY=RESTAURANT | 0.9 | 1 |
| PERIPHERAL RESTAURANT | PERIPHERY RETRIEVAL, QUERY=RESTAURANT | 0.8 | 0.5 |
| DRIVE HOME | HOME ROUTE RETRIEVAL | 0.9 | 2 |
| RETURN HOME | HOME ROUTE RETRIEVAL | 0.2 | 1 |
| RETURN BY ONE SCREEN | RETURN BY ONE SCREEN | 0.8 | 1 |
| RETURN BY ONE | RETURN BY ONE SCREEN | 0.5 | 2 |
| ... | ... | ... | ... |

USER LOG 1180

| DATE | TIME | DEVICE ID | USER ID | TEXT | INTENTION EXPRESSION (TOPIC, SLOT) | CORRECT FLAG | CORRECT INTENTION EXPRESSION (TOPIC, SLOT) |
|---|---|---|---|---|---|---|---|
| 2013/10/1 | 7:10 | 2595 | 19236 | NEARBY RESTAURANT | PERIPHERY RETRIEVAL, QUERY=RESTAURANT | CORRECT ANSWER | - |
| 2013/10/1 | 7:25 | 2595 | 19236 | RETRIEVE STATION AROUND HERE | PERIPHERY RETRIEVAL, QUERY=RESTAURANT | INCORRECT ANSWER | PERIPHERY RETRIEVAL, QUERY=STATION |
| 2013/10/1 | 8:03 | 131 | 4981 | RETRIEVE MY HOME | PERIPHERY RETRIEVAL, QUERY=MY HOME | INCORRECT ANSWER | HOME ROUTE RETRIEVAL |
| 2013/10/1 | 8:12 | 1848 | 7786 | TO PREVIOUS SCREEN | RETURN BY ONE SCREEN | CORRECT ANSWER | - |
| 2013/10/1 | 8:55 | 2595 | 21784 | RETURN HOME | HOME ROUTE RETRIEVAL | RULE | - |
| 2013/10/1 | 9:12 | 3457 | 19753 | RETURN TO THE HOUSE | RETURN BY ONE SCREEN | INCORRECT ANSWER | HOME ROUTE RETRIEVAL |
| ... | ... | ... | ... | ... | ... | ... | ... |

FIG.6

| TOPIC INTENTION IMPORTANCE LEVEL | | | | | |
|---|---|---|---|---|---|
| CORRECT INTENTION EXPRESSION \ ERROR INTENTION EXPRESSION | HOME ROUTE SETTING | PERIPHERY RETRIEVAL | ALONG-ROUTE RETRIEVAL | RETURN BY ONE SCREEN | ... |
| HOME ROUTE SETTING |  | 0.6 | 0.5 | 0.3 |  |
| PERIPHERY RETRIEVAL | 0.7 |  | 0.2 | 0.3 |  |
| ALONG-ROUTE RETRIEVAL | 0.7 | 0.1 |  | 0.3 |  |
| RETURN BY ONE SCREEN | 0.9 | 0.9 | 0.9 |  |  |
| ... |  |  |  |  |  |

FIG.7

SLOT INTENTION IMPORTANCE 1272

| CORRECT INTENTION EXPRESSION \ ERROR PATTERN OF SLOT | INCLUSION | PARTIAL MATCH | MISMATCH | ... |
|---|---|---|---|---|
| PERIPHERY RETRIEVAL | 0.1 | 0.2 | 0.4 | |
| HOME ROUTE SETTING | 0.1 | 0.2 | 0.4 | |
| ... | | | | |

FIG.8

| RULE TABLE ||
|---|---|
| STRING OF TEXTS | CORRECT INTENTION EXPRESSION |
| RETURN HOME | HOME ROUTE RETRIEVAL |
| RETURN TO THE HOUSE | HOME ROUTE RETRIEVAL |
| RETRIEVE %1 NEARBY | PERIPHERY RETRIEVAL, QUERY=%1 |
| . . . | . . . |

FIG.13

| TEXT | SPEECH FREQUENCY DATA | | DETAILED INFORMATION |
|---|---|---|---|
| | SPEECH FREQUENCY | POINT | |
| TO NEARBY CONVENIENCE STORE | 15651 | 12321 | [DEVICE ID=134, USER ID=1521, DAY AND TIME=2013.01.07 13:15], [DEVICE ID=1433, ...] |
| TO PERIPHERAL CONVENIENCE STORE | 11981 | 23456 | |
| TO CONVENIENCE STORE NEAR HERE | 4 | 543 | |
| TO CONVENIENCE STORE AROUND HERE | 1501 | 13401 | |
| ... | ... | ... | |

| DEVICE/USER DATA ||||||
|---|---|---|---|---|---|
| DEVICE ID | USER ID | UTILIZATION FREQUENCY [NUMBER OF TIMES/MONTH] | LAST UTILIZATION DAY | FIRST UTILIZATION DAY | EMPHASIS FLAG |
| 2595 | 19236 | 10 | 2014.11.5 | 2013.6.13 | — |
| 1848 | 19236 | 1 | 2014.8.1 | 2008.3.24 | — |
| 3457 | 4981 | 3 | 2014.10.6 | 2010.1.25 | ○ |
| ... | ... | ... | ... | ... | ... |

FIG.15

POINT TABLE 3200

| PRIORITY | POINT |
|---|---|
| 1.0 | 21000~ |
| 0.9 | 17000~ |
| 0.8 | 14000~ |
| . | . |
| . | . |
| 0.1 | 0~ |

INTENTION ESTIMATION EQUIPMENT AND INTENTION ESTIMATION SYSTEM

INCORPORATION BY REFERENCE

The disclosures of the following priority application and non-patent publications are herein incorporated by reference:

Japanese Patent Application No. 2014-262090 filed Dec. 25, 2014

X. Liu, R. Sarikaya, C. Brockett, C. Quirk, W. B. Dolan: "Paraphrase features to improve natural language understanding," Proc. of Interspeech 2013, pp. 3776-3779, 2013

C. Chelba, M. Mahajan, A. Acero: "Speech utterance classification," Proc. of ICASSP, pp. 280-283, 2003

J. Chu-Carroll, B. Carpenter: "Vector-based natural language call routing," Computational Linguistics, vol. 25, no. 3, pp. 361-388, 1999

BACKGROUND OF THE INVENTION

1. Field of the Invention

The present invention relates to an intention estimation equipment and an intention estimation system.

2. Description of Related Art

In recent years, electronic equipment, such as a smartphone or a car navigation device, allows users to perform many operations. It may be difficult for most users to memorize how to perform all the operations of such equipment. To assist users, equipment utilizing an intention estimation equipment that estimates user's intention has been proposed. This intention estimation equipment allows the user to input a word or words in a natural language with which the user comes up when he intends to perform an operation. The word or words are input in the form of voice information or character information. However, the word or words of natural language that is actually input by users have many variations so that it is practically difficult to perform intention estimation that covers all the words of the natural language. One approach to solve this problem may be to increase the accuracy of intention estimation by the intention estimation equipment by using log information of natural language that is recorded when the electronic equipment is actually utilized by the user.

SUMMARY OF THE INVENTION

JP 2012-47924A discloses a method for increasing the accuracy of estimation of an intention estimation equipment in the operation of electronic equipment by inputting natural language by users. This method involves training operations preferentially used by respective users and changing parameters used for the intention estimation for respective users, separately.

In the invention described in JP 2012-47924A mentioned above, attention is focused on the characteristics for each user. This fails to increase convenience of the users by training of the intention estimation equipment using logs in the respective natural languages for a plurality of users.

According to the 1st aspect of the present invention, an intention estimation equipment comprises: a first training data group including a plurality of pieces of training data each being constituted by a text and a correct intention expression correlated with each other; a second training data group including the plurality of pieces of training data in the first training data group and a plurality of pieces of training data not included in the first training data group; a model creation unit that creates a statistical model that, if a text is input, estimates an intention of the input text using the training data and outputs an intention estimation result; a first statistical model that is created by the model creation unit using the first training data group; a second statistical model created by the model creation unit using the second training data group; an error data extraction unit that extracts, from the second training data group, training data corresponding to a text, of which an intention estimation result output based on the first statistical model is correct and an intention estimation result output based on the second statistical model is erroneous, as error data; an opposite data extraction unit that extracts, from the second training data group, training data that is a cause for an intention estimation result of the error data output based on the second statistical model becoming erroneous as opposite data; and a data correction unit that performs correction of the second training data group so that an influence of the error data or an influence of the opposite data on creation of the statistical model is changed.

According to the 2nd aspect of the present invention, it is preferred that in the intention estimation equipment according to the 1st aspect, the training data further includes a priority indicating an index of importance of the text in intention estimation, and the data correction unit compares a priority of the error data with a priority of the opposite data and performs correction of the second training data group based on a result of the comparison.

According to the 3rd aspect of the present invention, it is preferred that in the intention estimation equipment according to the 2nd aspect, the data correction unit, if the priority of the error data is higher than the priority of the opposite data, performs correction of the second training data group to increase an influence of the error data or decreasing an influence of the opposite data in creating the statistical model.

According to the 4th aspect of the present invention, it is preferred that in the intention estimation equipment according to the 2nd aspect, the data correction unit, if the priority of the error data is lower than the priority of the opposite data, performs correction of the second training data group to decrease an influence of the error data or increasing an influence of the opposite data in creating the statistical model.

According to the 5th aspect of the present invention, it is preferred that in the intention estimation equipment according to the 1st aspect, the training data further includes a multiplying factor that represents a weight of the text in creating a statistical model by the model creation unit, and the data correction unit performs correction of the second training data group by changing the multiplying factor of the error data and the opposite data.

According to the 6th aspect of the present invention, the intention estimation equipment according to the 1st aspect may further comprise: a model evaluation unit that judges whether the second statistical model satisfies predetermined criteria based on an intention estimation result obtained by inputting any text into the second statistical model, wherein the data correction unit, if the evaluation unit judges that the second statistical model satisfies the predetermined criteria, performs correction of the second training data group, and the model creation unit creates again a second statistical model using the second training data group corrected by the data correction unit.

According to the 7th aspect of the present invention, it is preferred that in the intention estimation equipment according to the 1st aspect, the second training data group includes the first training data group and training data created based on information transmitted from a terminal that includes an input unit.

According to the 8th aspect of the present invention, the intention estimation equipment according to the 5th aspect may further comprise: a rule table in which a text and a correct intention correlated with the text are stored; and an intention estimation unit that outputs an intention estimation result for an input text based on the first statistical model or the rule table, wherein the data correction unit transfers training data that is included in the second training data group and has the multiplying factor outside a predetermined range to the rule table, and the intention estimation unit, if the input text is included in the rule table, outputs the intention estimation result based on the rule table without using the first statistical model.

According to the 9th aspect of the present invention, the intention estimation equipment according to the 1st aspect may further comprise: a communication unit that performs transmission/reception of information to/from a terminal that includes an input unit that detects an input based on a behavior of a user; an intention estimation unit that outputs an intention estimation result for an input text based on the first statistical model; and a correct judgment unit that judges whether an intention estimation result output by the intention estimation unit is true or false, wherein the communication unit transmits the intention estimation result output from the intention estimation unit to the terminal and receives from the terminal input information based on an input detected by the input unit within a predetermined period of time from receipt of the intention estimation result, and the correct judgment unit judges whether the intention estimation result output by the intention estimation unit based on the input information received by the communication unit is true or false.

According to the 10th aspect of the present invention, the intention estimation equipment according to the 1st aspect may further comprise: a notification unit that notifies a text of which an intention estimation result output based on the first statistical model is erroneous and an intention estimation result output based on the second statistical model is correct.

According to the 11th aspect of the present invention, the intention estimation equipment according to the 2nd aspect may further comprise: priority basic information that includes information relating to an intention importance table indicating relations among a correct intention, an error intention estimation result, and a degree of disadvantage, which represents magnitude of disadvantage a user receives when the error intention estimation result is output; and a priority setting unit that refers to the intention importance table and sets a priority based on the magnitude of the degree of disadvantage.

According to the 12th aspect of the present invention, it is preferred that in the intention estimation equipment according to the 11th aspect, the intention estimation result includes a function estimation result and a variable estimation result, the intention importance table includes a first intention importance table corresponding to an error of the function estimation result and a second intention importance table corresponding to an error of the variable estimation result, and the priority setting unit, if the function estimation result is erroneous, refers to the first intention importance table or if the variable estimation result is erroneous, refers to the second intention importance table, and sets the priority based on the magnitude of the degree of disadvantage.

According to the 13th aspect of the present invention, the intention estimation equipment according to the 2nd aspect may further comprise: a communication unit that performs transmission/reception of information to/from a terminal that includes an input unit that detects an input based on a behavior of a user and receives, from the terminal, input information based on the input detected by the input unit; and a priority setting unit that sets the priority based on a frequency in which a text is created based on input information received by the communication unit.

According to the 14th aspect of the present invention, the intention estimation equipment according to the 2nd aspect may further comprise: a communication unit that performs transmission/reception of information to/from a terminal including an input unit that detects an input based on a behavior of a user and receives, from the terminal, input information based on the input detected by the input unit, and a priority setting unit that determines the priority based on at least one of A to E below, (A) a preset importance of the terminal,
(B) a preset importance of the user,
(C) a frequency at which the terminal transmits the information,
(D) an elapsed time from last transmission of the information by the terminal, and
(E) an elapsed time from initial transmission of the information.

According to the 15th aspect of the present invention, an intention estimation system comprises: the intention estimation equipment according to claim 1 connected to the intention estimation system via a network; and a terminal connectable to the intention estimation equipment and to the intention estimation system via the network, wherein the terminal includes: an input unit that receives an input by a user; a transmission unit that transmits the input that is input to the input unit by the user to the intention estimation equipment; and an execution unit that receives an intention estimation result on the input by the user performed by the intention estimation equipment and acts according to the intention estimation result.

BRIEF DESCRIPTION OF THE DRAWINGS

FIG. 3 is a diagram showing an example of a basic training data group;

FIG. 5 is a diagram showing an example of a user log;

FIG. 6 is a diagram showing an example of topic intention importance;

FIG. 7 is a diagram showing an example of slot intention importance;

FIG. 8 is a diagram showing a rule table structure;

FIG. 13 is a diagram showing an example of speech frequency data;

FIG. 14 is a diagram showing an example of equipment/user data;

FIG. 15 is a diagram showing an example of a point table; and

DETAILED DESCRIPTION OF THE INVENTION

First Embodiment

Hereafter, an embodiment of an intention estimation system according to the present invention is explained with reference to FIGS. 1 to 12.

Figure 1:
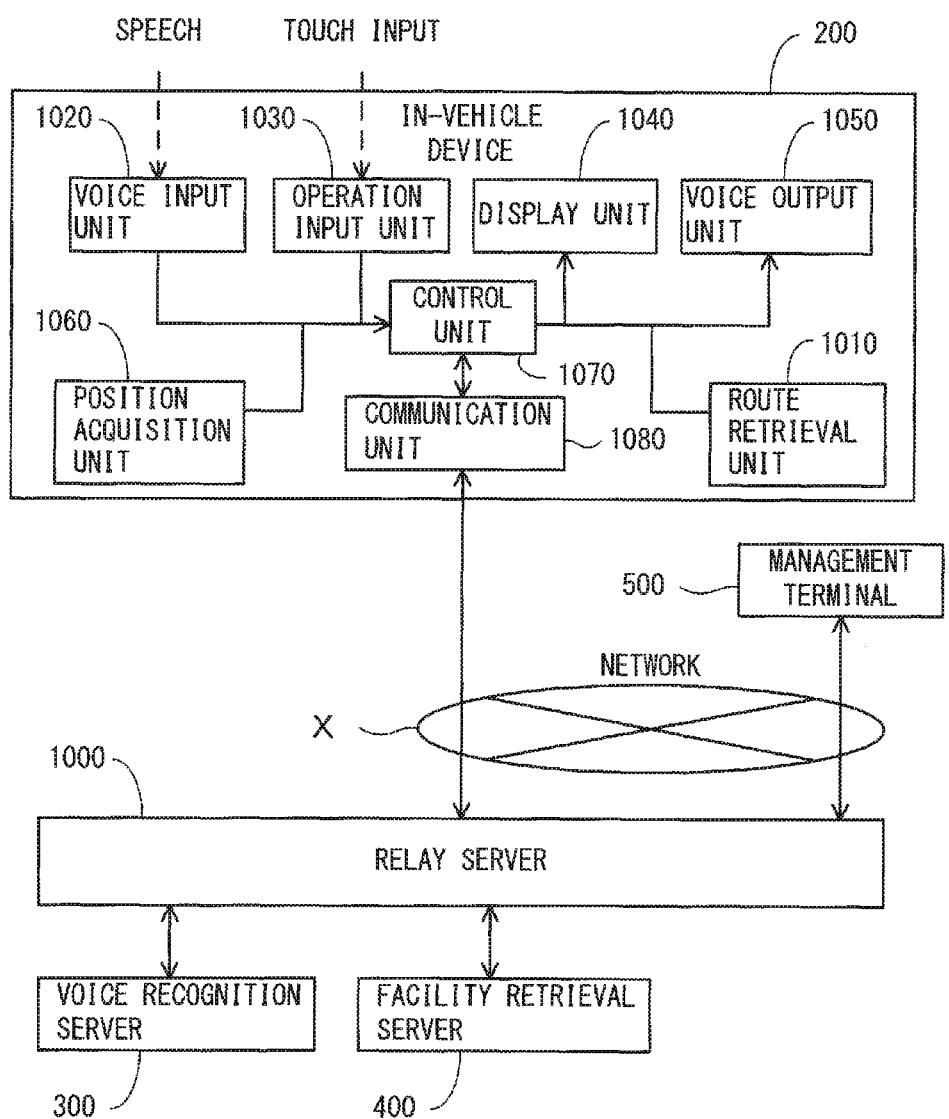
FIG. 1 is a block diagram showing an intention estimation system according to an embodiment of the present invention.

FIG. 1 is a block diagram showing the arrangement of an intention estimation system 1. The intention estimation system 1 includes an in-vehicle device 200, a relay server 1000, a voice recognition server 300, a facility retrieval server 400, and an administration terminal 500. The relay server 1000, the in-vehicle device 200, the voice recognition server 300, the facility retrieval server 400, and the administration terminal 500 communicate with each other via a communication network X. The arrangement of the relay server 1000 is explained later with reference to FIG. 2. Now, the arrangement of the in-vehicle device 200 is explained with reference to FIG. 1.

The in-vehicle device 200 is, for instance, a car navigation device mounted on a car. The in-vehicle device 200 includes a route retrieval unit 1010, a voice input unit 1020, an operation input unit 1030, a display unit 1040, a voice output unit 1050, a position acquisition unit 1060, a control unit 1070, and a communication unit 1080. The control unit 1070, as described later, outputs instructions for actions to the voice input unit 1020, the operation input unit 1030, the display unit 1040, the voice output unit 1050, the position acquisition unit 1060, and the communication unit 1080 and communicates various types of information with these units.

The voice input unit 1020 is, for instance, a microphone. The voice input unit 1020 starts action when it receives an instruction from the control unit 1070. The voice input unit 1020 detects a voice spoken by the user of the in-vehicle device 200 and converts the voice into an electric signal and outputs it to the control unit 1070.

Examples of the operation input unit 1030 include, for instance, a push button and a pointing device. The operation input unit 1030 detects an input operation by a user and outputs a signal corresponding to the detected input operation to the control unit 1070. The operation input unit 1030 includes a button that allows selection of a user who intends to perform voice input and a button that allows start of the voice input.

The display unit 1040 is, for instance, a liquid crystal display. The display unit 1040 brings on display characters and images according to the outputs from the control unit 1070 to present them to the user.

The voice output unit 1050 is, for instance, a speaker. The voice output unit 1050 outputs a voice according to the outputs from the control unit 1070 to notify the user of something.

The position acquisition unit 1060 is, for instance, a GPS receiver. The position acquisition unit 1060 receives radio waves from a satellite according to the instruction from the control unit 1070 and calculates the position of the in-vehicle device 200. The position acquisition unit 1060 outputs the calculated position to the control unit 1070.

The control unit 1070 includes a CPU, a ROM, and a RAM. The ROM stores a terminal ID for identifying the in-vehicle device 200. When the control unit 1070 receives a signal of the button to select a user from the operation input unit 1030, the control unit 1070 causes the user ID for identifying the user to be stored at the RAM. When the control unit 1070 receives a signal of the button to start the voice input from the operation input unit 1030, the control unit 1070 outputs an instruction for action to each of the voice input unit 1020 and the position acquisition unit 1060. The control unit 1070 transmits the signal that is output by the voice input unit 1020, the position that is output by the position acquisition unit 1060, the terminal ID that is stored at the ROM and the user ID to the relay server 1000. The relay server 1000 performs intention estimation of the transmitted information and the communication unit 1080 receives a result of intention estimation (hereafter, intention estimation result), which is a result of the intention estimation performed at the relay server 1000. The control unit 1070 acts according to the intention estimation result input by the communication unit 1080. For instance, if the control unit 1070 receives the result of intention estimation, "set home route", it causes the route retrieval unit 1010 to retrieve a route to home that is set in advance at the route retrieval unit 1010. The control unit 1070 causes the display unit 1040 to bring on display the result of the retrieval and causes the voice output unit 1050 to output a voice to notify the user of completion of the processing.

The communication unit 1080 communicates with the relay server 1000 via a communication network X. When the communication unit 1080 receives the intention estimation result from the relay server 1000, the communication unit 1080 outputs the received intention estimation result to the control unit 1070.

The voice recognition server 300 includes a voice recognition unit, which is not shown. When a signal of speech is input, the voice recognition unit outputs character information, that is, a text, corresponding to the voice signal. When the voice recognition server 300 receives a signal from the relay server 1000, the voice recognition server 300 inputs the signal to the voice recognition unit and transmits the obtained text to the relay server 1000.

The facility retrieval server 400 includes an unshown POI database that stores information relating to facilities. When the facility retrieval server 400 receives a retrieval query from the relay server 1000, the facility retrieval server 400 retrieves a POI database using the received retrieval query and transmits the obtained result of retrieval to the relay server 1000.

The administration terminal 500 manages the relay server 1000 according to the operation by the operator.

Configuration of Relay Server

Figure 2:
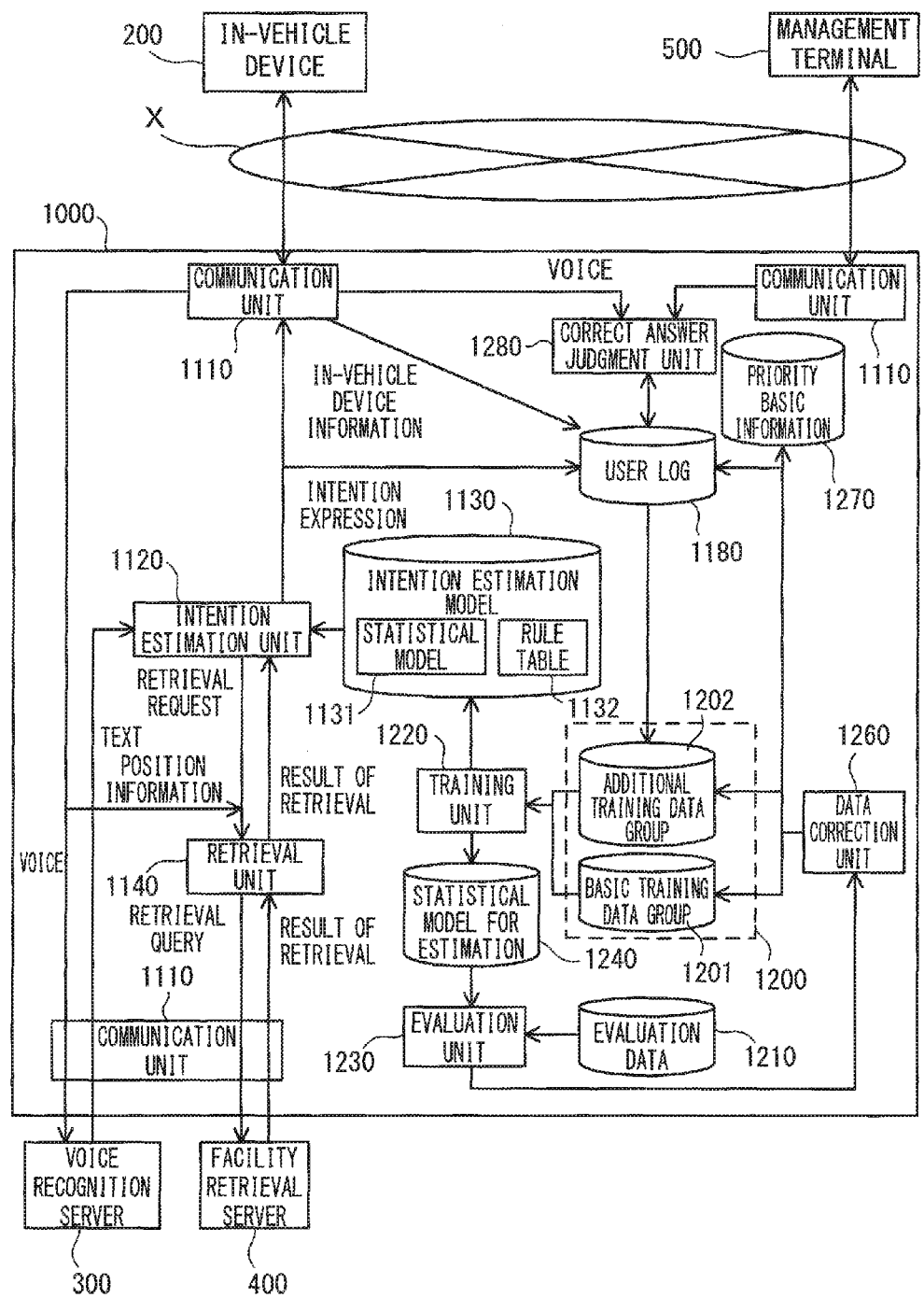
FIG. 2 is a block diagram showing the arrangement of a relay server.

The configuration of the relay server 1000 is explained with reference to FIG. 2. The relay server 1000 includes a communication unit 1110 that communicates with the external, a control unit, and a memory unit. The control unit includes a CPU, a ROM, and a RAM. FIG. 2 schematically expresses a plurality of functions that are executed by the control unit and a plurality of pieces of data that are stored at the memory unit as function blocks. Here, a general outline of all the components and correlations among the components are explained and subsequently data structures and specific actions of the components are explained.

The functions to be executed by the control unit are allotted to various functional units. Such functional units include an intention estimation unit 1120 that executes intention estimation, a retrieval unit 1140 that outputs an instruction for POI retrieval, and a training unit 1220 that outputs a statistical model for evaluation 1240 and a rule table 1132 when a basic training data group 1201 and an additional training data group 1202 are input. The functional units also include an evaluation unit 1230 that evaluates a statistical model for evaluation 1240, and a data correction unit 1260 that outputs an instruction for action, which includes correction of the basic training data group 1201 and the additional training data 1202, to the learning unit 1220 and the evaluation unit 1230.

Examples of the data stored at the memory unit include an intention estimation model 1130 used by the intention estimation unit 1120 for intention estimation, a user log 1180 which describes the result of estimation by the intention estimation unit 1120 and true or false of the result, an additional training data group 1202 which is training data created from the user log 1180 and a basic training data group 1201, an evaluation data 1210 for use in evaluation of a statistical model for evaluation 1240, the statistical model for evaluation 1240 which is created by the training unit 1220 and basic information on priority 1270 utilized in calculation of priority explained later.

General Outline of Functions

The communication unit 1110 communicates with the in-vehicle device 200, the voice recognition server 300, facility retrieval server 400, and the administration terminal 500 via the communication network X. When the communication unit 1110 receives from the in-vehicle device 200 a voice signal, position information, a terminal ID, and a user ID, the communication unit 1110 transmits a voice signal to the voice recognition server 300 and outputs position information to the retrieval unit 1140. The communication unit 1110 records the voice signal, the terminal ID, the user ID, and present time of day at the user log 1180. When the communication unit 1110 receives a text, which is the result of recognition of a voice signal, from the voice recognition server 300, the communication unit 1110 outputs the received text to the intention estimation unit 1120. When a retrieval query is input from the retrieval unit 1140, the communication unit 1110 transmits the received retrieval query to the facility retrieval server 400. When the communication unit 1110 receives a result of the retrieval from the facility retrieval server 400, the communication unit 1110 outputs the result of the retrieval to the retrieval unit 1140.

The intention estimation unit 1120 estimates the intention of the text input from the communication unit 1110 using the intention estimation model 1130 and outputs the intention estimation result. The intention estimation result is explained in detail later. The intention estimation unit 1120 outputs the intension estimation result to the in-vehicle device 200 via the communication unit 1110 and writes in the intension estimation result at the user log 1180. However, if the intention estimation result requires POI retrieval, such as periphery retrieval, the intention estimation unit 1120 outputs the result not to the in-vehicle device 200 directly but to the retrieval unit 1140. Then, the retrieval unit 1140 outputs the intension estimation result from the intention estimation unit 1120 together with the result of retrieval by the retrieval unit 1140 to the in-vehicle device 200.

The retrieval unit 1140 creates a retrieval query according to the position information input from the communication unit 1110 and a retrieval condition input from the intention estimation unit 1120 and transmits the created retrieval query to the facility retrieval server 400 via the communication unit 1110. The retrieval unit 1140 outputs the result of retrieval received from the facility retrieval server 400 to the intention estimation unit 1120.

The training unit 1220 creates the statistical model for evaluation 1240 using the additional training data group 1202 and the basic training data group 1201. The statistical model for evaluation 1240 is created for replacing the statistical model 1131 with it. If the evaluation unit 1230 makes a positive evaluation on the statistical model for evaluation 1240, the prior and existing statistical model 1131 is destroyed and the statistical model for evaluation 1240 is stored at the intention estimation model 1130 as a new statistical model 1131. Although details are described later, the training unit 1220, during the process of creating the statistical model for evaluation 1240 or after the statistical model for evaluation 1240 is created, updates the rule table 1132.

The evaluation unit 1230 evaluates the statistical model for evaluation 1240 using the evaluation data 1210. Method for evaluation and criteria of evaluation are described later. If the evaluation unit 1230 makes a positive evaluation, the statistical model for evaluation 1240 replaces the statistical model 1131 as described above. If the evaluation unit 1230 makes a negative evaluation, the data correction unit 1260 starts its action.

The data correction unit 1260 creates the additional training data group 1202. The data correction unit 1260 corrects the additional training data group 1202 and the basic training data group 1201 as described later. This correction includes a step up method and a step down method. Which one of the methods to adopt is input by the administration terminal 500 in advance. After the correction is performed, the data correction unit 1260 instructs again creation of the statistical model for evaluation 1240 to the training unit 1220. That is, the correction of the additional training data group 1202 and basic training data group 1201 at the data correction unit 1260 is intended to cause the statistical model for evaluation 1240 that is created again to be positively evaluated by the evaluation unit 1230.

The correct judgment unit 1280 refers to the text recorded at the user log 1180 and the intention estimation result obtained by processing the text by the intention estimation unit 1120 and judges whether the result of the intention estimation performed by the intention estimation unit 1120 is correct. The correct judgment unit 1280 records the result of judgment and, records, if it judges that the result is incorrect, a correct intention (hereafter, referred to as a correct intention expression) at the user log 1180. The operator operates the administration terminal 500 to activate the correct judgment unit 1280. That is, the operator judges whether the intention estimation result given by the intention estimation unit 1120 is correct and what the correct intention expression is.

General Outline of Data

The intention estimation model 1130 includes a statistical model 1131 and a rule table 1132. The statistical model 1131 and the rule table 1132 are used for estimating the intention of the text output from the voice recognition server 300 by the intention estimation unit 1120. As described above, the statistical model 1131 is created by the training unit 1220 as the statistical model for evaluation 1240 on which a positive evaluation has been made by the evaluation unit 1230.

Into the user log 1180 is written various pieces of information by the communication unit 1110, the intention estimation unit 1120, and the correct judgment unit 1280. The communication unit 1110 writes in a terminal ID, a user ID, and a time of day of reception. The intention estimation unit 1120 writes in the text received from the voice recognition server 300 and the intention estimation result processed by the intention estimation unit 1120 correlated with each other at the user log 1180. The correct judgment unit 1280 writes in whether the intention estimation result of the input text by the intention estimation unit 1120 is correct and, if the intention estimation result is incorrect, a correct intention expression. The user log 1180 is deleted after a series of processes is performed by the data correction unit 1260.

The additional training data group 1202 includes an assembly of a plurality of pieces of training data (additional training data) created based on the user log 1180. The additional training data includes the data extracted from the user log 1180 by the data correction unit 1260 to which data priority and multiplying factor are added that are described later. The data correction unit 1260 reads in the user log 1180 and extracts the text of the data that is judged by the correct judgment unit 1280 to be an incorrect answer and the correct intention expression given by the correct judgment unit 1280 on the text. Subsequently, the data correction unit 1260 correlates the extracted pieces of information with each other and records the correlated information at the additional training data group 1202 as additional training data. On this occasion, the priority and the multiplying factor are recorded by the technique described later. The data included in the additional training data group 1202 is transferred to the basic training data group 1201 by the process described later.

The basic training data group 1201 is an assembly of a plurality of pieces of training data (basic training data) each including a text, a correct intention, priority, and multiplying factor, which are correlated with each other. The basic training data included in the basic training data group 1201 is the sum of the pieces of training data provided from the beginning when the operation of the system is started and the pieces of training data accumulated in the past by the additional training data group 1202 as additional training data. That is, the basic training data group 1201 at some point in time includes all the pieces of the training data included in the additional training data group 1202 up to that point in time.

The evaluation data 1210, which is data used for evaluating the statistical model for evaluation 1240, is constituted by combinations of texts and correct intentions. In the present embodiment, it is assumed that the evaluation data 1210 includes the same contents as those of the additional training data group 1202 and the basic training data group 1201. That is, the combination of the text with the correct intention in each training data in the additional training data group 1202 and in the basic training data group 1201 is used as the evaluation data 1210.

The statistical model for evaluation 1240 is created by the training unit 1220 based on the basic training data group 1201 and the additional training data group 1202. The statistical model for evaluation 1240 is evaluated by the evaluation unit 1230. If a positive evaluation is made on it, it becomes the statistical model 1131 whereas if a negative evaluation is made on it, it is created again by the process described later. That is, the statistical model for evaluation 1240 exists only temporarily.

The basic information on priority 1270 is read in when the data correction unit 1260 determines the priority that is described later.

Topic and Slot

The intention estimation using the statistical model 1131 involves conversion of the text received from the voice recognition server 300 into an intention expression that represents the operation to the in-vehicle device 200 intended by the user. The intention expression may be made in any form. In the present embodiment, it is expressed as a string of characters. An intention expression is estimated from two aspects, i.e., "topic" corresponding to the function to be executed and "slot" representing a variable that may vary diversely and needs to be determined when the function is executed. The topic includes, for instance, periphery retrieval, along route retrieval, air conditioner setting, and home route retrieval. The slot includes, for instance, a facility retrieval query in the periphery retrieval and the along route retrieval, and a set temperature of the air conditioner in the air conditioner setting. In the present embodiment, one intention expression is expressed by a string of characters with a topic and a slot being separated by a comma (,).

For instance, "periphery retrieval, query=restaurant" is an intention expression that expresses the intention to "retrieve a restaurant around the position of the own vehicle". "Along route retrieval, query=restaurant" is an intention expression that indicates the intention to "retrieve a restaurant on the periphery of the route from the position of the own vehicle to the destination". The "home route retrieval" is an intention expression that indicates the intention to "retrieve a route to the position of home set at the in-vehicle device and start route guidance". Some intention expressions, like the home route retrieval, include no slots and are expressed only with topics. This type of intention expression is designed to enable a desired function of the in-vehicle device to be specified.

Training Data

Figure 4:
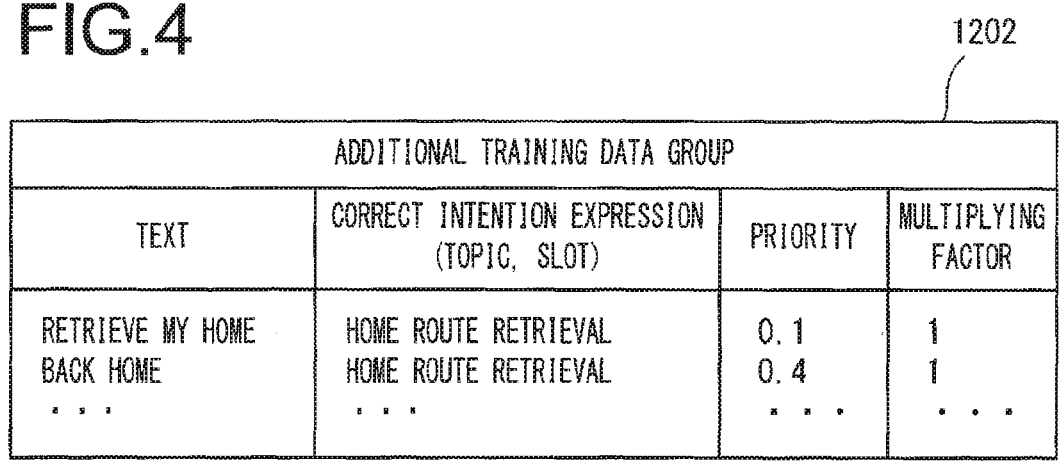
FIG. 4 is a diagram showing an example of an additional training data group.

With reference to FIGS. 3 to 4, data structures of the basic training data group 1201, the additional training data group 1202, and the training data group 1200, which is a combination of the two groups 1201 and 1202, are explained. These training data groups include each one or more pieces of training data. Each training data includes one text, one correct intention expression, which is the correct intention of the text, one multiplying factor, and one priority. The text, the correct intention expression, the multiplying factor, and the priority, which constitute the training data, are correlated with each other.

The text is obtained by converting the speech of the user of the in-vehicle device 200 into a string of characters. The text may be a text that is output by the voice recognition server 300 or a text that is written by a human who listens to a voice and free of voice recognition errors. The correct intention expression includes a topic and a slot that describe the correct intention of the text separately from different aspects. The operator of the administration terminal 500 operates the correct judgment unit 1280 to determine the correct intention expression correlated with the text. The multiplying factor is a value indicating the weight of the text correlated with the multiplying factor in the training.

FIG. 3 shows an example of the basic training data group 1201 and FIG. 4 shows an example of the additional training data group 1202. In the following explanation, the basic training data group 1201 and the additional training data group 1202 may also be referred to collectively as the training data group 1200. In the examples shown in FIG. 3 and FIG. 4, for instance, the priority is a real number of 0 to 1 and the multiplying factor is a real number of 0 to 10.

In the example shown in FIG. 3, top six records, that is, six pieces of training data of the basic training data group 1201 are shown. The topmost record shows that the correct intention expression of the text of "nearby restaurant" includes a topic corresponding to the type of function "periphery retrieval" and a slot corresponding to the variable "restaurant".

The basic training data group 1201 includes a plurality of records.

User Log

With reference to FIG. 5, the data structure of the user log 1180 is explained. FIG. 5 is a diagram showing an example of the user log 1180. The user log 1180 includes a plurality of records. One record includes date and time at which a voice signal is received, an equipment ID that identifies the in-vehicle device 200, a user ID that identifies the user of the in-vehicle device 200, a text, an intention expression which is an intention estimation result of the text performed by the intention estimation unit 1120, a correct flag given by the operator of the administration terminal 500, and a correct intention expression. If the correct flag represents a correct answer, the correct intention expression is absent. In the example shown in FIG. 5, if the correct flag indicates a correct answer, the intention expression is expressed as blank (-).

Topic Intention Importance, Slot Intention Importance

With reference to FIGS. 6 to 8, the data structures of the topic intention importance 1271 and the slot intention importance 1272 that constitute basic information on priority 1270 are explained. Both of these quantify the degree of disadvantage to the user if the intention estimation of the text created based on the speech of the user is erroneously made by the statistical model 1131. The larger the values are, the more serious the disadvantage to the user is. In the present embodiment, the priority and the level of importance are in such a relationship that allows direct comparison of magnitudes.

The topic intention importance 1271 is a table that contains values quantifying the level of disadvantage given to the user as a level of importance if the estimation of topic is incorrect. FIG. 6 is a diagram showing an example of the topic intention importance 1271. Specifying a row of the table by the selected topic of the correct intention expression and the column of the table by the selected topic of the intention expression (which is erroneous) in identifying an intersection point, the value of which indicates magnitude of disadvantage given to the user, that is, level of importance. For instance, explanation is made using the third record from the top of the user log 1180 shown in FIG. 5. In this case, the correct intention expression is "set home route" and so the first line is selected. The intention expression is "periphery retrieval" and so the second column is selected. The intersection point indicates "0.6" and so the level of importance is determined to be 0.6.

The value of the topic intention importance 1271 is determined, for instance, in the following manner. For instance, it is assumed that as a result of the user's speech "one screen back", the intention estimation result indicates "set home route". In this case, although the user simply intends to go back by one screen only, the in-vehicle device 200 causes the display the user is watching to be canceled by the display unit 1040, retrieves the route to home, and starts route guidance. To transition from the state in which the route guidance has started to the screen the user wanted to watch, it is necessary first to cancel the route guidance to home and perform the operation for accessing the screen the user was watching previously. Thus, it takes a lot of trouble and time to perform the operation the user actually wants. Consequently, the magnitude of the degree of disadvantage to the user is judged to be large and the value in the table is set relatively large. On the other hand, it is supposed that although the user speaks "retrieve a restaurant around here" to have performed "periphery retrieval" in his true intention, the intention estimation results in "along-route retrieval".

In this case, the in-vehicle device 200 brings on display the result of retrieval of restaurants along the route, which restaurants may include many restaurants that are on the periphery of the own vehicle. In many cases, the speech such as "restaurant easy to access" may match the desire of the user regardless of whether the type of retrieval is "peripheral retrieval" or "along-route retrieval". Consequently, the magnitude of the degree of disadvantage to the user when the intention estimation is performed erroneously by the along-route retrieval instead of the periphery retrieval is relatively small, so that the value in the table is set relatively small.

The slot intention importance 1272 is a table in which values quantifying the magnitude of the degree of disadvantage given to the user are shown if the estimation of the slot is performed incorrectly. FIG. 7 is a diagram showing an example of the slot intention importance 1272. A row is specified by the topic of the correct intention expression and a column is specified by the pattern of errors of the slot of the intention expression. The patterns of errors of slot include, for instance, inclusion, partial match, and mismatch. Hereafter, explanation is made on the patterns of errors of slot taking an example.

For instance, if the text reads as "go to a nearby Italian restaurant that serves good meals", the correct intention expression is "periphery retrieval, query=Italian restaurant having good meals". The inclusion means that the estimated slot includes not only the string of characters of correct answer but also a string of characters other than the correct answer mixed in. In the above example, an error of slot corresponding to the inclusion is, for instance, "query=go to an Italian restaurant that serves good meals". In this case, the query needed is included in the extracted query, so that it is highly possible that the POI retrieval is performed correctly. Consequently, values in the table for this error pattern are set relatively small.

The partial match means that the estimated slot is a part of the slot of the correct answer. In this case, the error of slot that corresponds to the partial match is, for instance, "query=Italian". In this case, a part of the query needed is used in the retrieval and thus the possibility that the POI retrieval is performed correctly is moderate. Consequently, the value in the table for this error pattern is set moderate.

The mismatch means that the estimated slot is a string of characters that includes no slot of correct answer at all. In the above example, the error of slot corresponding to mismatch is, for instance, "query=go". In this case, the possibility that correct retrieval is performed is none. Consequently, the value in the table for this error pattern is set large.

Rule Table

With reference to FIG. 8, explanation is made on the structure of the rule table 1132.

The rule table 1132 includes a plurality of records. One record includes a text and a correct intention expression. Each record in the rule table 1132 is created by removing the priority and the multiplying factor from the corresponding record in the training data group 1200. The intention estimation unit 1120 retrieves a string of characters in the rule table 1132 that corresponds to the text output from the voice recognition server 300. The intention estimation unit 1120 outputs the correct intention expression correlated with the string of characters that matches the text as an intention expression to the communication unit 1110 and the user log 1180. In this case, the intention estimation unit 1120 causes the correct flag of the user log 1180 to be set to "rule" to manifest that the rule table 1132 is referred to.

Relationship Between Statistical Model and Rule Table

Explanation is made on the statistical model 1131 and the rule table 1132 included in the intention estimation model 1130. The statistical model 1131 is used when the intention estimation is executed by a statistical method. The rule table 1132 is used when the intention estimation is executed by pattern matching. In the present embodiment, the intension estimations by the two methods are used complementarily. The intention estimation by pattern matching enables one to understand that the user's speech explicitly indicates a specified intention according to the rule described in the rule table 1132. Consequently, the intention estimation by pattern matching has an advantage in that it enables intention estimation to be performed aiming at specified speech pattern matching. However, this only allows understanding the speech that conforms to the speech pattern matching provided in advance. Commonly, the statistical method is more suitable for accepting a wide variety of expressions. Consequently, in the present embodiment, if the input text is included in the rule table 1132, the intention estimation by pattern matching is performed using the rule table 1132 instead of the statistical model 1131.

Statistical Model

To execute the intention estimation by the statistical method, it is necessary to construct, by a statistical method, in advance an intention estimation model that is obtained by creating a model of relationship between a text and a correct intention expression from a training data in which a number of pairs of text and correct intention expression are assembled. This process is called "training". For instance, non-patent literature 1 listed below discloses the technology of estimation, in which the part corresponding to the topic in the present embodiment is estimated by a classification device that uses a statistical method called Support Vector Machine and the part corresponding to the slot in the present embodiment is estimated by a statistical method called Conditional Random Field. Non-patent literature 2 listed below discloses a method in which the part corresponding to the slot in the present invention is achieved by a statistical method called a maximum entropy method. Non-patent literature 3 listed below discloses a vector-based method in which a representative point in a multi-dimensional space indicating one topic is obtained from the training data, a distance between a multi-dimensional vector obtained from the input sentence and the representative point of the topic is calculated, and the topic that gives the smallest distance is output as the result of the intention estimation.

Non-Patent Literature 1

X. Liu, R. Sarikaya, C. Brockett, C. Quirk, W. B. Dolan: "Paraphrase features to improve natural language understanding," Proc. of Interspeech 2013, pp. 3776-3779, 2013

Non-Patent Literature 2

C. Chelba, M. Mahaj an, A. Acero: "Speech utterance classification," Proc. of ICASSP, pp. 280-283, 2003

Non-patent literature 3

J. Chu-Carroll, B. Carpenter: "Vector-based natural language call routing," Computational Linguistics, vol. 25, no. 3, pp. 361-388, 1999

PRIORITY

In the present embodiment, unique concepts of priority and multiplying factor are introduced into the statistical method. The priority and the multiplying factor are concepts that allow comparison of magnitude between priorities and between multiplying factors each correlated with the text. For instance, the priority and the multiplying factor may be expressed by numerical values such as 0.0~1.0 and ~10~+10 or by alphabets of A to Z. The priority and the multiplying factor are different concepts from each other and these are not compared with each other in magnitude. In the present embodiment, the priority is expressed by a real number of 0 to 1 and the multiplying factor is expressed by a real number of 0 to 10.

The priority is an index indicating how important the intention of the correlated text is correctly estimated. The priority is not used in the training of the statistical model 1131 but is used in the evaluation of the statistical model 1131 and the correction of the training data group 1200. The priority is set by the data correction unit 1260.

For instance, in the example of the basic training data group 1201 shown in FIG. 3, the priority of the text "nearby restaurant" is set to a high value of "0.9". The reason for this is that many users speak "nearby restaurant" and if the intention estimation is performed incorrectly, the disadvantage to the users is considered extensive. Also, in FIG. 3, the priority of the text "return home" is set to a low value of "0.2". The reason for this is that few users speak "return to home" or some users spoke "return to home" in the past but they already do not use the in-vehicle device and for other reasons, so that it is considered that failure of correct intention estimation causes less disadvantage.

Multiplying Factor

A multiplying factor is a value that indicates the weight of the text correlated with the multiplying factor in training. The initial value of the multiplying factor is "1" and updated by the data correction unit 1260 by the process described later.

This multiplying factor is utilized in the training at the training unit 1220, for instance, as follows. In the training of the statistical model that uses the maximum entropy method disclosed in the non-patent literature 2, use is made of a method of increasing the number of texts used in the training according to the value described in the multiplying factor. In the example of the basic training data group 1201 shown in FIG. 3, for the record corresponding to the text "return by one", the multiplying factor is set to 2. Accordingly, in the training of the statistical model, two sets of the text "return by one" and the correct intention expression "return by one screen" are input.

Also, the multiplying factor may be used as follows. In the training of the statistical model using the vector-based method shown in the non-patent literature 3 above, the text in the training data is converted into a multi-dimensional vector having respective vector elements corresponding to the words of the text in advance. On this occasion, use is made of not only a method in which the value of each vector element corresponding each word is set to 1 but also a method in which a value that indicates how important each word is in the topic is calculated by a certain technique and the calculated value is used as the value of the element. For instance, in the method disclosed in the non-patent literature 3 above, a value that is larger for a smaller number of types of topic (IDF: inverse document frequency) is used as the value of element. In the present embodiment, the multiplying factor calculated according to the present embodiment may be used as the value of the element of the vector. For instance, for the text "return by one", the elements of the vector corresponding to the words "by one" and "return" are given 2 instead of 1. In addition, a method in which depending on the statistical method used, the text is regarded important corresponding to the value of the multiplying factor.

Step Up Method and Step Down Method

If it is desired to correctly perform intention estimation of a certain text, the multiplying factor to be correlated to the text is set to a larger value. This is referred to as a step up method in the present embodiment. In contrast, a certain text having a high multiplying factor may have an adverse influence on the training of other texts. For instance, presence of the text "return to home" in the training data causes failure of correct intention estimation of other high priority data (for instance, "drive home"). Accordingly, to change the multiplying factor, a reverse approach may be adopted.

That is, decreasing all the multiplying factor correlated with the texts used in the training other than the multiplying factor of the text of which correct intention estimation is desired provides a similar effect. However, it is troublesome to change a large number of multiplying factors and thus only the following objects that are expected to provide relatively high effects are selected as targets for changing the multiplying factor. The text of which the multiplying factor is to be decreased is a text of which the intention estimation is different from the text that is desired to be subjected to correct intention estimation but is similar to such text. The method of decreasing the multiplying factor of the text that has a predetermined relationship with the text which is desired to be subjected to correct intention estimation is called a step-down method in the present embodiment. If the multiplying factor of a text is decreased by the step-down method, it is possible that the text is not correctly estimated its intention, so that it is desirable that the multiplying factor of texts having high priorities is not decreased as far as possible.

Main Flowchart

The operator accesses the relay server 1000 at a predetermined time interval of, for instance, 12 hours using the administration terminal 500 and accesses the correct judgment unit 1280 via the communication unit 1110. The operator reviews the user log 1180 and based on his experience writes in a correct answer flag to the user log 1180. If the correct flag is set to incorrect answer, he also writes in the correct intention expression.

The data correction unit 1260, each time when the writing in of the user log 1180 by the operator is completed, counts the number of records of which the correct flag is incorrect answer. If it is judged that the number of such records is larger than a predetermined number, the data correction unit 1260 starts execution of the program the action of which is illustrated in the flowcharts shown in FIGS. 9 to 12. This program performs creation of the additional training data group 1202, setting of priority, updating of the statistical model 1131 and the rule table 1132, and notification to the users of the in-vehicle device 200. At the time when the execution of the program is started, the user log 1180 has a plurality of records given a correct flag and a correct intention expression as shown in FIG. 5. At the time when the execution of the program is started, the additional training data group 1202 is empty and the basic training data group 1201 has a plurality of records as shown in FIG. 3.

The subject executing the procedure in the flowchart explained as below is a CPU included in the control unit in the relay server 1000.

First, with reference to FIG. 9, the action of the process in the flowchart is explained and subsequently the action of a subroutine is explained with reference to FIGS. 10 to 12.

In step S4010, the data correction unit 1260 reads in the basic training data group 1201.

Figure 10:
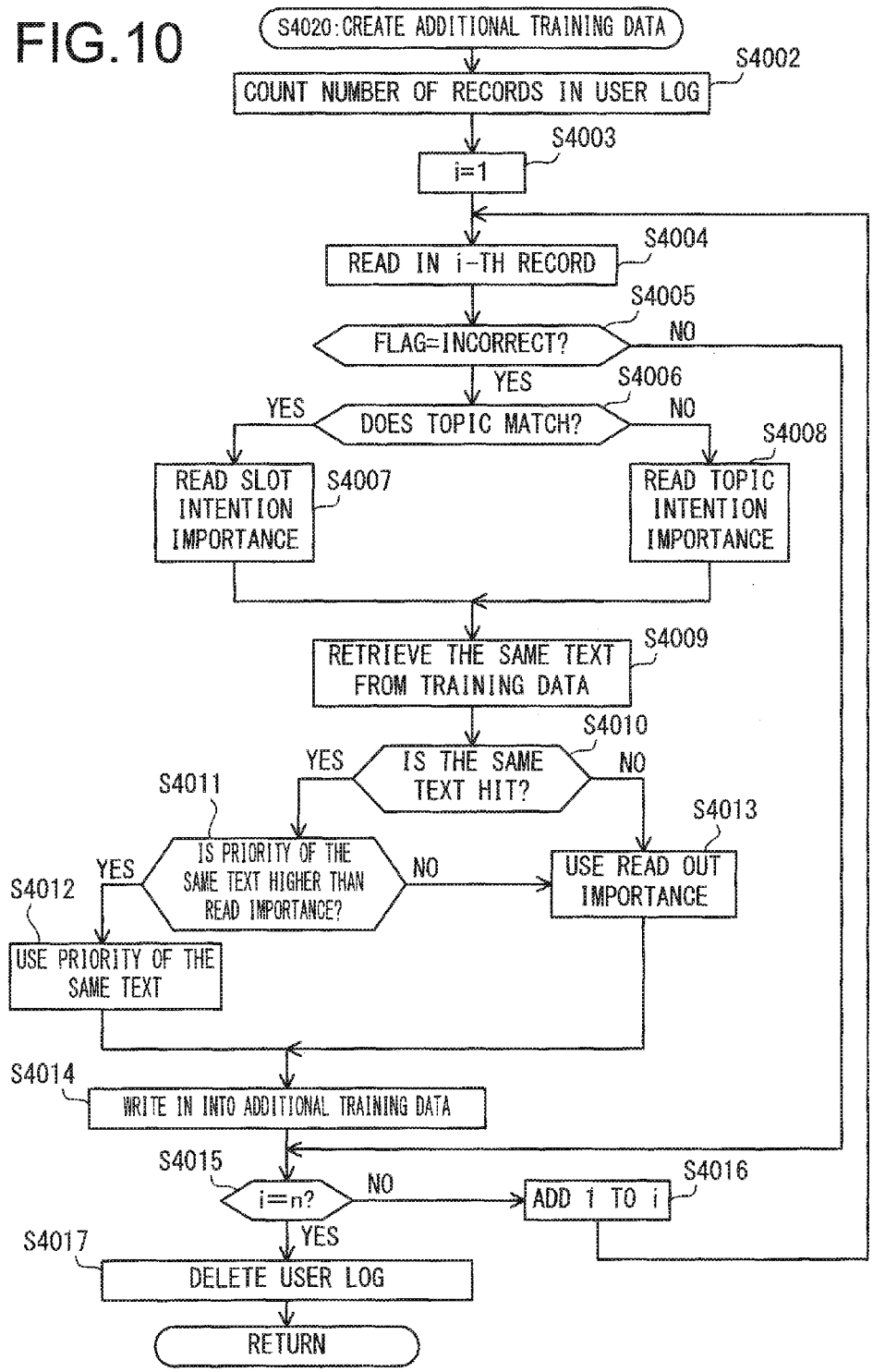
FIG. 10 is a diagram illustrating a subroutine that creates an additional training data group.

In step S4020, the data correction unit 1260 executes the subroutine illustrated in FIG. 10 to create the additional training data group 1202. In this subroutine, the additional training data group 1202 having a plurality of records as shown in FIG. 3 is created. The action of the subroutine illustrated in FIG. 10 is explained later. Then, the process proceeds to step S4030.

In step S4030, the data correction unit 1260 causes the training unit 1220 to create a statistical model for evaluation 1240 using the basic training data group 1201 read-in in step S4010 and the additional training data group 1202 created in step S4020. The training unit 1220 creates, for instance, a statistical model using the method of Support Vector Machines or estimating topics and a statistical model using the method of Conditional Random Field for estimating slots. As mentioned above, in the training for creating the statistical model, a text, a correct intention expression, and a multiplying factor are used. Then, the process proceeds to step S4040.

In step S4040, the data correction unit 1260 causes the evaluation unit 1230 to evaluate the statistical model for evaluation 1240 created in step S4030 based on the evaluation data 1210. That is, the evaluation of the statistical model for evaluation 1240 is performed by the evaluation unit 1230 using a combination of the text and the correct intention in each training data in the additional training data group 1202 and the basic training data group 1201. For instance, the evaluation unit 1230 evaluates the statistical model for evaluation 1240 based on the following three criteria.

(A) The text of the evaluation data 1210 is input to both the statistical model 1131 and the statistical model for evaluation 1240 to obtain respective estimated intention expressions. If the obtained estimated intention expression matches the correct intention expression correlated with the input text, the obtained estimated intention expression is defined as a correct answer. The statistical model for evaluation 1240 has an accuracy rate higher than the statistical model 1131 by a predetermined rate or more.

(B) The text of the evaluation data 1210 is input to both the statistical model 1131 and the statistical model for evaluation 1240 to obtain respective estimated intention expressions. If the estimated intention expression mismatches the correct intention expression correlated with the input text, the estimated intention expression is defined as an incorrect answer. The evaluation data 1210 that is a correct answer for the statistical model 1131 but is an incorrect answer for the statistical model for evaluation 1240 has a rate smaller than a predetermined rate.

(C) The text of the evaluation data 1210 is input to the statistical model for evaluation 1240 to obtain an estimated intention expression. The number of correct answers is larger than a predetermined number or the rate of correct answer is higher than a predetermined rate.

All the above three criteria are evaluated and then the process proceeds to step S4050.

In step S4050, the data correction unit 1260 judges whether as a result of evaluation by the evaluation unit 1230 in step S4040, the statistical model for evaluation 1240 reaches predetermined acceptance criteria, for instance, whether it satisfies all the three criteria. If the data correction unit 1260 judges that the acceptance criteria are reached, the process proceeds to step S4200 whereas if the data correction unit 1260 judges that the acceptance criteria are unreached, the process proceeds to step S4060.

In step S4060, the data correction unit 1260 performs extraction of error data from the additional training data group 1202 and the basic training data group 1201. Here, a text is specified, of which the intention estimation result output based on the statistical model 1131 is correct but the intention estimation result output based on the statistical model for evaluation 1240 is erroneous. Then, in the additional training data group 1202 and the basic training data group 1201, training data corresponding to this text is specified and extracted as error data. Specifically, from a plurality of pieces of training data that constitute the additional training data group 1202 and the basic training data group 1201 are extracted all the pieces of training data that include a text of which evaluation based on the statistical model 1131 outputs a correct answer whereas evaluation based on the statistical model for evaluation 1240 outputs an incorrect answer, as error data. That is, if any text of error data is input into the statistical model 1131, a correct intention expression correlated with the input text is output, however, if the same text is input into the statistical model for evaluation 1240, no correct intention expression is obtained. The number of pieces of extracted error data is defined as m. Then, the process proceeds to step S4061.

Figure 11:
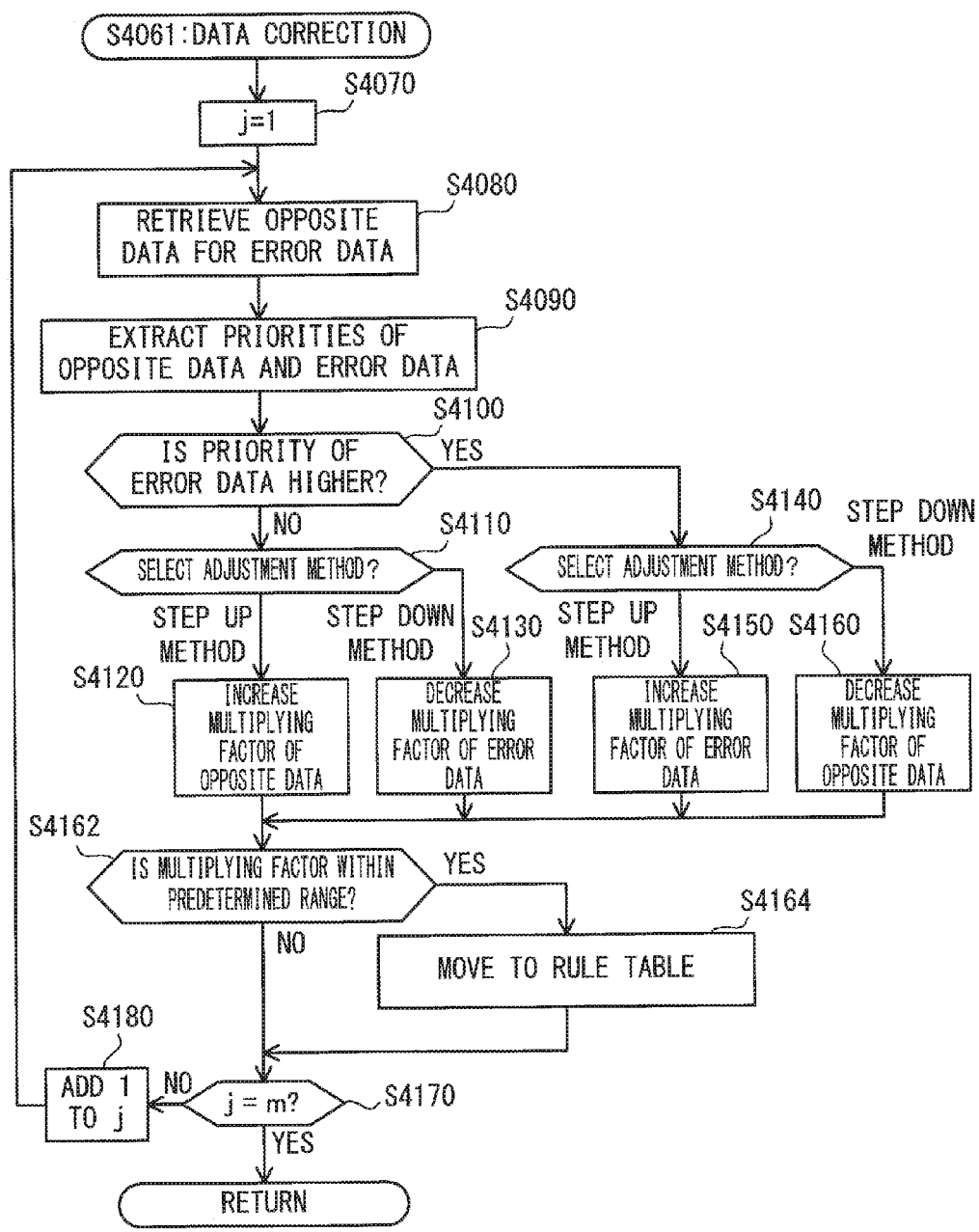
FIG. 11 is a diagram illustrating a subroutine that corrects the training data group.

In step S4061, the data correction unit 1260 executes the subroutine shown in FIG. 11 to correct the additional training data group 1202 and the basic training data group 1201. In this subroutine, the multiplying factors included in the additional training data group 1202 and the basic training data group 1201 are corrected. The action in the subroutine illustrated in FIG. 11 is explained later. Then, the process returns to step S4030.

In step S4200, which is executed if it is judged that the statistical model for evaluation 1240 reaches the acceptance criteria, the data correction unit 1260 extracts error data from the additional training data group 1202 and the basic training data group 1201 in the same manner as that in step S4060. Then, the data correction unit 1260 adds a combination of the text represented by each extracted error data and the correct intention expression to the rule table 1132. Subsequently, the process proceeds to step S4220.

In step S4220, the data correction unit 1260 transfers all the records of the additional training data group 1202 to the basic training data group 1201 and stores them together with the existing records at the basic training data group 1201. This enables the basic training data group 1201 to be updated using the additional training data group 1202. The records including error data extracted in step S4200 may be deleted from the basic training data group 1201 after the basic training data group 1201 is updated. Then, the process proceeds to step S4230.

In step S4230, the data correction unit 1260 extracts a new understanding text from the basic training data group 1201 updated in step S4220. Here, among the texts of a plurality of pieces of training data included in the basic training data group 1201, a text, of which the intention estimation result output based on the statistical model 1131 is erroneous but the intention estimation result output based on the statistical model for evaluation 1240 is correct, is extract as a new understanding text. In other words, a text, of which the statistical model for evaluation 1240 created in step S4210 outputs a correct answer but the statistical model 1131 outputs an incorrect answer, is extracted from the basic training data group 1201 as a new understanding text. That is, if a new understanding text is input into the statistical model for evaluation 1240, a correct intention expression correlated with the text is output but if the same text is input into the statistical model 1131, no correct intention expression is obtained. In addition, there is, among the texts that are added to rule table 1132 in step S4200, a text, of which intention estimation by a combination of the statistical model 1131 and the rule table 1132 before the processing in S4200 fails to give a correct understanding. Such text is also added to the category of the new understanding text. Then, the process proceeds to step S4240.

In step S4240, the data correction unit 1260 retrieves the user log 1180 to extract an equipment ID described in a record that includes a new understanding text and has a correct flag that indicates incorrect answer. That is, the equipment ID of an in-vehicle device 200, from which a voice signal representing a new understanding text was output in the past, with the relay server 1000 having failed then to output a correct intention expression, is extracted from the user log 1180. Then, the process proceeds to step S4250.

In step S4250, the data correction unit 1260 notifies the in-vehicle device 200 having the equipment ID extract in step S4240 that intention estimation of the new understanding text is now possible. For instance, assuming that a new understanding text is expressed as " . . . ", the data correction unit 1260 transmits a message that reads as "the system has been updated and now understands . . . " to the in-vehicle device 200. The in-vehicle device 200 that received this message notifies the user of this condition using the display unit 1040 or the voice output unit 1050. Then, the process proceeds to step S4260.

In step S4260, the data correction unit 1260 deletes the present statistical model 1131 and adopts the statistical model for evaluation 1240 created in step S4030 as a new updated statistical model 1131. With this, the action of the flowchart illustrated in FIG. 9 is completed.

Subroutine that Creates Additional Training

Figure 9:
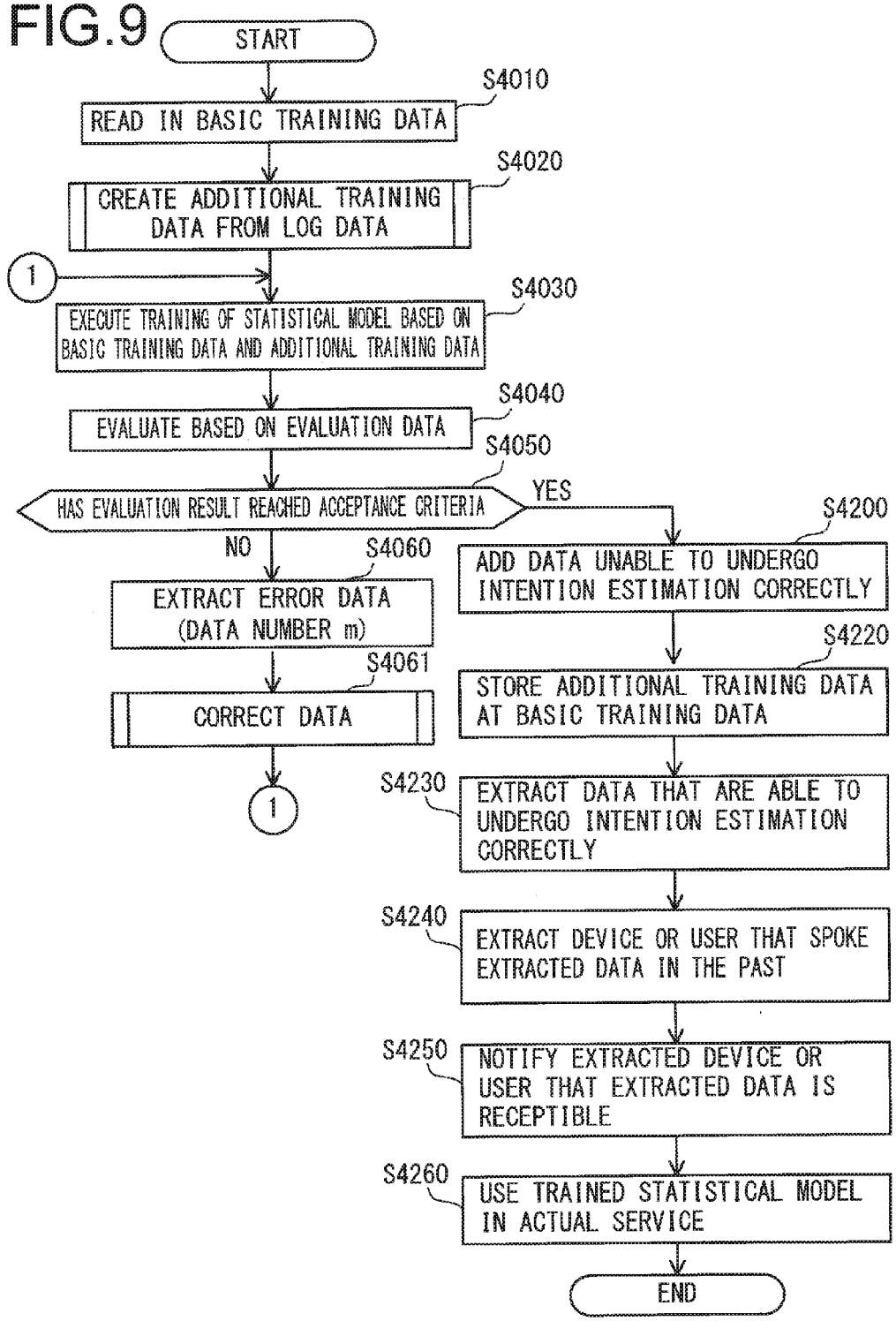
FIG. 9 is a diagram showing a flowchart of processing performed by a data correction unit.

The action of the subroutine invoked from step S4001 in FIG. 9 is explained with reference to FIG. 10.

In step S4002, the data correction unit 1260 reads in the user log 1180 and stores a total record number of it, which is defined as n. The total record number n is used later in step S4015. Then, the process proceeds to step S4003.

In step S4003, the data correction unit 1260 plugs in 1 for variable i and the process proceeds to step S4004.

In step S4004, the data correction unit 1260 reads in a part of the i-th record of the user log 1180, that is, a text, an intention expression, a correct flag, and a correct intention expression. Then, the process proceeds to step S4005.

In step S4005, the data correction unit 1260 judges whether the read-in correct flag is "incorrect answer". If the data correction unit 1260 judges that the read-in correct flag is "incorrect answer", the process proceeds to step S4006. If the data correction unit 1260 judges that the read-in correct flag is "correct answer" or "rule", the process proceeds to step S4015.

In step S4006, the data correction unit 1260 judges whether the topic of the intention expression matches the topic of the correct intention expression. If the data correction unit 1260 judges that they match, the process proceeds to step S4007 whereas if it judges that they mismatch, the process proceeds to step S4008.

In the process in step S4007, which is executed if the slot is an incorrect answer, that is, the topics match each other but an incorrect answer is output, the data correction unit 1260 reads the relevant level of importance with reference to the slot intention importance 1272 shown in FIG. 7 as an example. That is, first, the data correction unit 1260 judges which of the patterns, for instance, inclusion, partial matching, and mismatching the error pattern matching of slot corresponds to. Then, the data correction unit 1260 specifies the row of slot intention importance 1272 from the topic of the correct intention expression and further specifies the column of the slot intention importance 1272 based on the judged slot error pattern matching and reads the level of importance. Then, the process proceeds to step S4009.

In step S4008, which is executed when the topics mismatch each other, the data correction unit 1260 reads the relevant level of importance with reference to the topic intention importance 1271. That is, the data correction unit 1260 specifies the row of the topic intention importance 1271 based on the topic of the correct intention expression and further specifies the column of the topic intention importance 1271 based on the topic of the intention expression and reads the level of importance. Then, the process proceeds to step S4009.

In step S4009, the data correction unit 1260 retrieves a record having the same text as that described in the i-th record in the user log 1180 from the additional training data group 1202 and the basic training data group 1201. Then, the process proceeds to step S4010.

In step S4010, the data correction unit 1260 judges whether as a result of the retrieval in step S4009, any record that has the same text as such text has been retrieved. If the data correction unit 1260 judges that a record having the same text as such text is hit as a result of the retrieval, the process proceeds to step S4011 whereas if it judges that no such hit is obtained, the process proceeds to step S4013.

In step S4011, which is executed if any record that has the same text as that described in the i-th record in the user log 1180, the data correction unit 1260 compares in magnitude the priority of the record hit by the retrieval in step S4009 (hereafter, referred to as "record priority") with importance read out in step S4007 or step S4008 (hereafter, referred to as "read-out importance"). If the data correction unit 1260 judges that the record priority is higher than the read-out importance, the process proceeds to step S4012 and otherwise, the process proceeds to step S4013.

In step S4012, which is executed if the record priority is judged to be higher than the read-out importance, the data correction unit 1260 determines the record priority to be a priority that is newly set and the process proceeds to step S4014. In this case, it is intended to eliminate imparting a relatively low priority to a record having the same text as that of the record for which a relatively high priority was set previously.

In step S4013, which is executed if no record that has the same text as that of the i-th record in the user log 1180 is hit upon the retrieval or if it is judged that the read-out importance is equal to or lower than the record priority, the data correction unit 1260 determines the read-out importance as priority to be newly set and the process proceeds to step S4014.

In step S4014, the data correction unit 1260 writes in the text of the i-th record in the user log 1180, the correct intention expression, the priority determined in step S4012 or step S4013, and the multiplying factor of which the initial value is set to "1" to a new record in the additional training data group 1202. Then, the process proceeds to step S4015.

In step S4015, the data correction unit 1260 judges whether the variable i is the same as the total record number n in the user log 1180. If it judges that the variable i is the same as n, the process proceeds to step S4017 or if it judges that the variable i is not the same as n, that is, the variable i is less than n, the process proceeds to step S4016.

In step S4016, the data correction unit 1260 adds 1 to the variable i and the process returns to step S4004.

In step S4017, the data correction unit 1260 deletes the user log 1180 to terminate the flowchart shown in FIG. 10. Then, the process proceeds to step S4030 in FIG. 9.

Subroutine for Correcting Training Data

The action of the subroutine invoked from step S4061 in FIG. 9 is explained with reference to FIG. 11. The subroutine shown in FIG. 11 corrects the multiplying factor of the additional training data group 1202 and the basic training data group 1201 using error data with the total data number m. The error data is assigned numbers 1 to m in order.

In step S4070, the data correction unit 1260 plugs in 1 for a variable j that indicates error data of object of processing. Then, the process proceeds to step S4080.

In step S4080, the data correction unit 1260 extracts opposite data that opposites to the j-th error data from the additional training data group 1202 and the basic training data group 1201. The opposite data is "data which is a record in the training data group 1200 and is considered to be a cause of failure in providing a correct intention expression if error data is input into a statistical model constructed by using the training data group 1200 because of the opposite data that opposites to the record concerned in the training data group 1200". Specifically, for instance, as the opposite data with the j-th error data, training data that includes a text that is the same as or similar to the error data and a correct intention different from the correct intention correlated with the error data can be extracted from the training data group 1200.

In the intention estimation technology based on the statistical method, commonly, the text spoken by the user is converted into a multi-dimensional vector expression. Specifically, the text is divided into words and converted into written characters of each word, a chain of two words (2-gram), a chain of three words (3-gram), a part of speech of each word, and an ID separately defined representing the meaning of each word, and so on. Respective pieces of information obtained from the text are called features. If the training data group 1200 and the evaluation data 1210 are all known, the number of types of feature included in the data is finite. And so, by deeming each of the features as an element of a multi-dimensional vector, a multi-dimensional vector having an element corresponding to the feature obtained from a certain text to which 1 is assigned and the other elements to each of which is assigned 0 is obtained.

In the estimation of topics in the intention estimation, it is assumed that in a multi-dimensional space, points representing respective topics (i.e., representative points) and spaces that are interpreted to be respective topics (i.e., topic spaces) are defined. Then, the multi-dimensional vector obtained from the text of concern is mapped in the multi-dimensional space, and it is determined by calculation which representative point the mapped multi-dimensional vector is closest to and which topic space the mapped multi-dimensional vector belongs to. The topic specified in this manner is output as an intention estimation result. In the above-mentioned processing, similarity between the multi-dimensional vector obtained from the text of error data and the multi-dimensional vector obtained from the text of training data is calculated. This similarity indicates a distance between the two multi-dimensional vectors. Training data having a distance equal to or less than a reference value is defined to be opposite data. To calculate the similarity between vectors, for instance, a method using pure Euclid distance and a method using vector cosign similarity may be adopted. In addition, a method of multiplying the multi-dimensional vector obtained from a text with a conversion matrix to decrease the number of dimensions (i.e., latent semantic indexing) may be used. If this method is used, distances are calculated between the multi-dimensional vectors after they are multiplied with a conversion matrix. Then, the process proceeds to step S4090.

In step S4090, the data correction unit 1260 extracts the priority of the j-th opposite data and the priority of the error data hit by the retrieval from the training data group 1200 in step S4080. Then, the process proceeds to step S4100.

In step S4100, the data correction unit 1260 compares the magnitude of the priority of the opposite data extracted in step S4090 with the priority of the error data. If it judges that the value of the priority of the error data is relatively large, the process proceeds to step S4140 and if it judges that the value of the priority of the error data is equal to or smaller than the value of the priority of the opposite data, the process proceeds to step S4110.

In step S4110, the data correction unit 1260 judges what an adjustment method is designated to the data correction unit 1260 by the administration terminal 500 in advance. If it judges that the above-mentioned step-up method is designated to it, the process proceeds to step S4120 whereas if it judges that the above-mentioned step-down method is designated to it, the process proceeds to step S4130.

In step S4120, the data correction unit 1260 increases the multiplying factor included in one record in the learning data group 1200, which is opposite data, by a predetermined amount, for instance, 1. Then, the process proceeds to step S4162.

In step S4130, the data correction unit 1260 decreases the multiplying factor included in one record in the learning data group 1200, which is error data, by a predetermined amount, for instance, 0.5. Then, the process proceeds to step S4162.

In step S4140, the data correction unit 1260 judges what an adjustment method is designated by the administration terminal 500 to the data correction unit 1260. If it judges that the step-up method is designated to it, the process proceeds to step S4150 whereas if it judges that the step-down method is designated to it, the process proceeds to step S4160.

In step S4150, the data correction unit 1260 increases the multiplying factor included in one record in the training data group 1200, which is error data, by a predetermined amount, for instance, 1. Then, the process proceeds to step S4162.

In step S4160, the data correction unit 1260 decreases the multiplying factor included in one record in the training data group 1200, which is opposite data, by a predetermined amount, for instance, 0.5. Then, the process proceeds to step S4162.

By executing any of the above-explained processes in steps S4120, S4130, S4150, and S4160, the data correction unit 1260 is able to perform correction of the training data group 1200, so that the influences of the error data or opposite data on the creation of the statistical model for evaluation 1240 by the training unit 1220 can be changed.

In step S4162, the data correction unit 1260 judges whether as a result of the change in multiplying factor performed in the step immediately before, the multiplying factor after the change is within a predetermined range, for instance, in the range of 0.5 or more and less than 10. If it judges that the change is within the above-mentioned range, the process proceeds to step S4170 whereas if it judges that the change is outside the above-mentioned range, the process proceeds to step S4164.

In step S4164, the data correction unit 1260 transfers to the rule table 1132, one record in the training data group 1200, which is opposite data, of which it judges in step S4162 that the multiplying factor is outside the predetermined range or one record in the training data group 1200, which is error data, of which it judges in step S4162 that the multiplying factor is outside the predetermined range. That is, the data correction unit 1260 deletes such record from the training data group 1200 and adds the text and the correct intention expression of such record to the rule table 1132. Then, the process proceeds to step S4170.

In step S4170, the data correction unit 1260 judges whether the variable j that indicates error data, which is the target of processing, is the same as m, which represents the total number of pieces of the error data. If it judges that j is the same as m, that is, the last processing of error data is completed, the data correction unit 1260 terminates the execution of the process in the flowchart illustrated in FIG. 11. Then, the process returns to step S4030 in FIG. 9. If it judges that j is different from m, that is, at least the last error data remains to be processed, the process proceeds to step S4180.

In step S4180, the data correction unit 1260 adds 1 to the variable j and replaces the error data, which is the target of the processing, by error data with a next number. Then, the process returns to step S4080.

Transition of Statistical Model and Training Data

In summary of the action of the relay server 1000, with reference to the flowchart as necessary, explanation is made on the relationship between the statistical model 1131 and the statistical model for evaluation 1240 and on the relationships among the user log 1180, the additional training data group 1202, and the basic training data group 1201.

Figure 12:
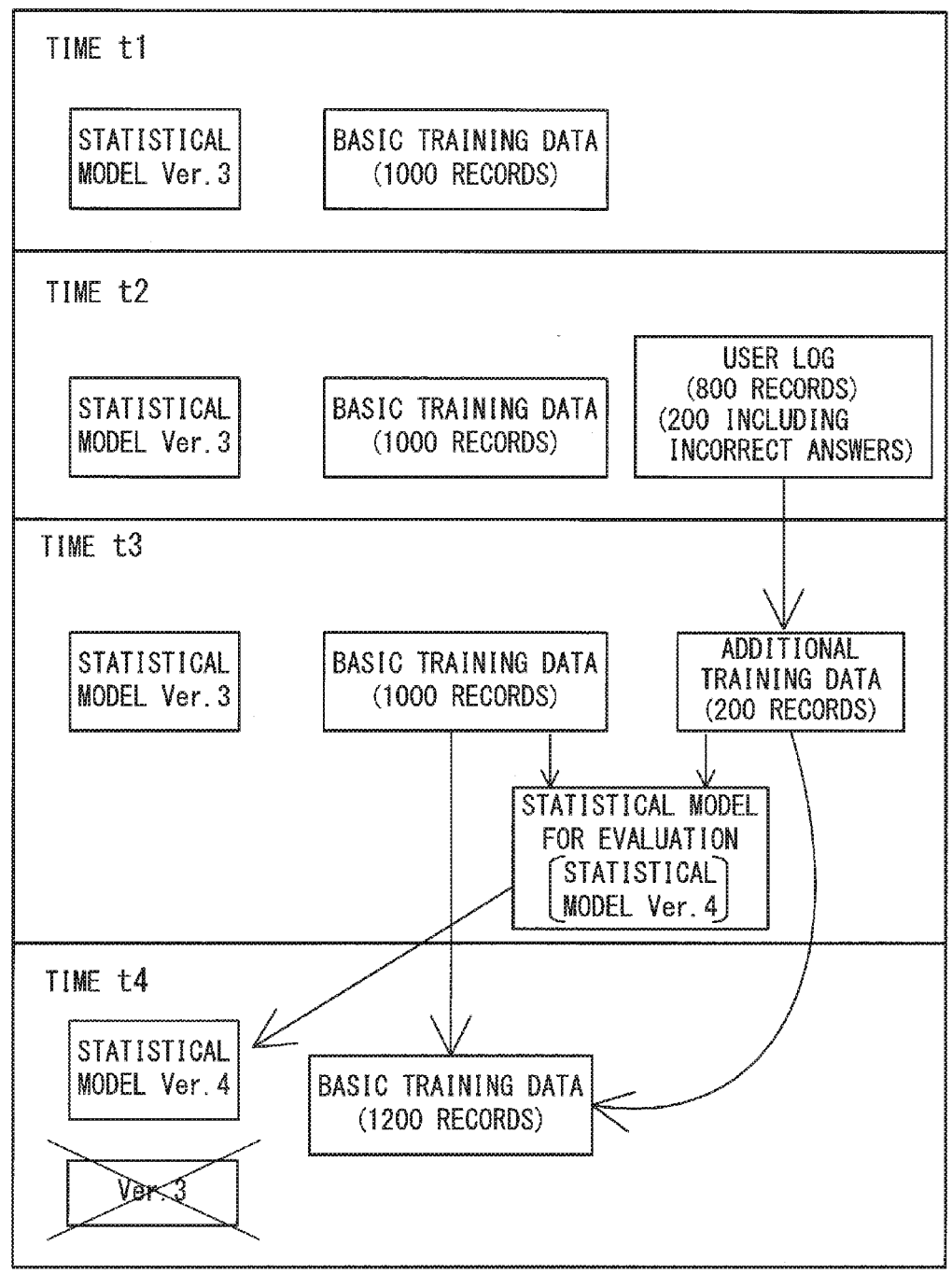
FIG. 12 is a schematic diagram illustrating a process of updating a statistical model.

FIG. 12 is a schematic diagram illustrating the process of updating the statistical model 1131. In FIG. 12, time elapses from top to the bottom. In the explanations thus far made, one and the same name has been used for the statistical model 1131 regardless of before and after updating. However, here, the version number of the statistical model 1131 is increased by 1 each time when it is created for distinction. In addition, respective record numbers of the user log 1180, the additional training data group 1202, and the basic training data group 1201 are clearly specified.

At time t1, the relay server 1000 has, for instance, the statistical model 1131, version 3, and the basic training data group 1201 having a record number of 1000. The user log 1180 and the additional training data group 1202 have each a record number of 0 and description of the record number is omitted. Subsequently, the relay server 1000 receives voice signals from the in-vehicle device 200 and performs intention estimation using the statistical model, version 3, and records the result of the estimation at the user log 1180.

At time t2, the relay server 1000 has the statistical model 1131, version 3, and the basic training data group 1201 having a record number 1000 similarly at time t1. Further, the relay server 1000 has, for instance, the user log 1180 having a record number of 800. The additional training data group 1202 has a record number of 0 and description of the record number is omitted. Each record stored in the user log 1180 is given a correct flag by the correct judgment unit 1280. Among the records with the correct flags, for instance, 200 records are given flags indicating incorrect answer. At time t2, the processing illustrated in the flowchart in FIG. 9 is started by the data correction unit 1260. After this, up until time t4, no voice signal is output from the in-vehicle device 200 and hence no data is added to the user log 1180.

At time t3, the relay server 1000 has the statistical model 1131, version number 3, and the basic training data group 1201 similarly at times t1 and t2. The relay server 1000 further includes the additional training data group 1202 and a statistical model of version 4, that is, the statistical model for evaluation 1240. The basic training data group 1201 has a constant record number of 1000 from time t2 on. As shown in step S4005 in FIG. 10, only if the correct flag of the user log 1180 indicates an incorrect answer, a record of the additional training data group 1202 is created. Consequently, the record number of the additional training data group 1202 is the same as the number of records in the user log 1180 at time t2, of which the correct flag indicates incorrect answer, i.e., 200. The user log 1180 is deleted by the processing in step S4017 in FIG. 10, that is, the record number is zero (0), so that description of its record number is omitted. The statistical model, version 4, was created by the training unit 1220 using the basic training data group 1201 having a record number of 1000 and the additional training data group 1202 having a record number of 200 (step S4030 in FIG. 9).

In this mode at time t3, the evaluation at the evaluation unit 1230 (step S4040) reached acceptance criteria the first time (step S4050:YES), and hence subsequent processes after step S4200 are executed. That is, as far as FIG. 12 is concerned, the additional training data group 1202 is added to the basic training data group 1201 in step S4220, and the statistical model 1131 is updated in step S4260.

At time t4, the relay server 1000 has the statistical model 1131, version 4, and the basic training data group 1201 having a record number of 1200. The basic training data group 1201, which is obtained by adding the additional training data group 1202 to the basic training data group 1201 at time t3, has thus a record number of 1200. The statistical model 1131, version 3, is rewritten as version 4 and the unchanged version 3 is deleted.

The mode at this time t4 is the same as the mode at time t1 except for the version number of the statistical model 1131 and the record number of the basic training data group 1201. That is, the relay server 1000 repeatedly takes modes at times t1 to t3 in order.

According to the first embodiment, the following operations and advantageous effects are obtained.

(1) The relay server 1000, that is, the intention estimation device according to the present embodiment comprises: a first training data group including a plurality of pieces of training data each being constituted by a text and a correct intention expression correlated with each other, that is, the basic training data group 1201; a second training data group including a plurality of pieces of training data included in the first training data group and a plurality of pieces of training data not included in the first training data that is, a training data group 1200 that includes the basic training data group 1201 and the additional training data group 1202; a model creation unit that creates a statistical model that when a text is input, estimates an intention of the text using training data and outputs an intention estimation result (step S4030 in FIG. 11), that is, the training unit 1220; a first statistical model created by the training unit 1220 using the basic training data group 1201, that is, the statistical model 1131; and a second statistical model created by the training unit 1220 using the training data group 1200, that is, the statistical model for evaluation 1240.

The relay server 1000 further includes an error data extraction unit that extracts, as error data, training data corresponding to a text, of which an intention estimation result output based on the statistical model 1131 is correct and a result intention estimation output based on the statistical model for evaluation 1240 is erroneous from the training data group 1200 (step S4060 in FIG. 9); and a opposite data extraction unit that extracts, as opposite data, training data on a cause for which an intention estimation result of error data based on the statistical model for evaluation 1240 is erroneous from the training data group 1200 (step S4080 in FIG. 11).

The relay server 1000 further includes the data correction unit 1260 that corrects the training data group 1200 so as to change influences of error data or opposite data in the creation of a statistical model by the training unit 1220 (steps S4120, S4130, S4150, and S4160 in FIG. 11).

The relay server 1000 thus configured enables training using a log in a natural language by a plurality of users to be performed and enables the intention of texts to be more correctly estimated. This increases convenience of the users.

If the multiplying factor of the error data is to be increased, there remains the possibility that intention estimation of texts having low priorities is also correctly performed. If the multiplying factor of the opposite data is decreased, adverse influences on texts with high priorities can be promptly removed, so that the texts with high priorities come to be correctly understood. Since no increase in the training data occurs, no increase in training time occurs.

(2) The training data included in the training data group 1200 further includes priority, which is an index indicating importance in the intention estimation of the text. The data correction unit 1260 compares the priority of the error data with the priority of the opposite data (step S4110 in FIG. 11) and executes any one of processes in steps S4120, S4130, S4150, and S4160 based on the result of the comparison to correct the training data group 1200. This enables correction of the training data group 1200 to be performed appropriately reflecting the importance of the error data and opposite data in the intention estimation.

(3) The data correction unit 1260, if the priority of the error data is higher than the priority of the opposite data, corrects the training data group 1200, so that an influence of error data in creating a statistical model is increased by increasing the multiplying factor of the error data in step S4150 or so that an influence of opposite data in creating a statistical model is decreased by decreasing the multiplying factor of the opposite data in step S4160. This configuration enables correction of the training data group 1200 to be performed so that the intention estimation of a text corresponding to error data with a higher priority can be correctly performed.

(4) On the other hand, if the priority of the error data is lower than the priority of the opposite data, the data correction unit 1260 performs correction of the training data group 1200, so that the influence of the error data in creating a statistical model is decreased by decreasing the multiplying factor of the error data in step S4130 or increasing the influence of the opposite data in creating a statistical model by increasing the multiplying factor of the opposite data in step S4120. This configuration enables correction of the training data group 1200 to be performed so that the intention estimation of a text corresponding to opposite data with a higher priority can be correctly performed.

(5) The training data in the training data group 1200 further includes a multiplying factor that represents a weight of the text in creating a statistical model by the training unit 1220. The data correction unit 1260 performs correction of the training data group 1200 by changing the multiplying factor of the error data or the opposite data steps S4120, S4130, S4150, and S4160. This configuration enables correction of the training data group 1200 by simple processing with ease so that the influence of the error data or the opposite data in the creation of a statistical model by the training unit 1220 can be changed.

(6) The data correction unit 1260 extracts, as opposite data, such training data that having a text that is the same as or similar to the error data and a correct intention different from the correct intention correlated with the error data from the training data group 1200 in step S4080. This construction enables reliable and easy to perform extraction of the opposite data for the error data.

(7) The relay server 1000 further includes the evaluation unit 1230 that judges whether the statistical model for evaluation 1240 satisfies predetermined criteria based on the intention estimation result of a text obtained by inputting the text to the statistical model for evaluation 1240 (steps S4040 and S4050 in FIG. 9). The data correction unit 1260, if the evaluation unit 1230 judges that the statistical model for evaluation 1240 fails to satisfy the predetermined criteria, executes the processing in step S4061 to correct the training data group 1200. The training unit 1220 again executes the processing in step S4030 using the training data group 1200 corrected by the data correction unit 1260 in this manner to create a statistical model for evaluation 1240 again. This construction enables creation of the statistical model for evaluation 1240 at high precision by repeating correction of the training data group 1200.

(8) The data correction unit 1260 judges whether the statistical model for evaluation 1240 satisfies the predetermined criteria based on at least one of the following conditions A to C:
(A) The statistical model for evaluation 1240 provides a correct intention at a rate higher than the statistical model 1131 by a predetermined rate or more.
(B) The statistical model 1131 provides a correct intention and the statistical model for evaluation 1240 provides no correct intention at a rate equal to or less than the predetermined rate.
(C) If training data that is included in the second training data group but is not included in the first training data group is input into the statistical model for evaluation 1240, the correct intention is obtained at a rate equal to or higher than the predetermined rate Consequently, the statistical model for evaluation 1240 can be evaluated from different aspects. In the evaluation according to (A) above, it is evaluated that the rate of correct answer in the intention estimation is relatively high. In the evaluation according to (B) above, it is evaluated that the text, which thus far has allowed correct intention estimation, now disallows correct intention estimation, is present at a sufficiently low rate. In the evaluation according to (C), it is evaluated that the intention estimation becomes possible again.

(9) The second training data group, that is, the training data group 1200, includes the first training data group, that is, the basic training data group 1201, and the additional training data group 1202 created by the voice recognition server 300 and the correct judgment unit 1280 based on the information transmitted from the in-vehicle device 200 including the voice input unit 1020.

Consequently, the training unit 1220 is capable of performing training using data similar to that used in the intention estimation performed by the intention estimation unit 1120.

(10) The relay server 1000 includes the rule table 1132 at which a text and a correct intention correlated with the text are stored and the intention estimation unit 1120 that outputs an intention estimation result on the input text based on the statistical model 1131 or the rule table 1132. The data correction unit 1260 transfers training data having a multiplying factor outside a predetermined range out of the training data included in the training data group 1200 to the rule table 1132 (step S4164 in FIG. 11). The intention estimation unit 1120, if the input text is included in the rule table 1132, outputs the intention estimation result based on the rule table 1132 without using the statistical model 1131.

Consequently, by using a combination of two different types of intention estimation methods, correct intention estimation on many texts can be performed to users' convenience. If correction of the training data group 1200 results in a change in the multiplying factor correlated with a text in certain training data to become outside a predetermined range, such training data is transferred to the rule table 1132 and is deleted from the training data group 1200. This eliminates adverse influences that training data having a relatively high multiplying factor may have on the other training data upon creation of the statistical model for evaluation 1240 by the training unit 1220. In addition, for the training data that has a relatively low multiplying factor and is poorly represented by the statistical model for evaluation 1240, the intention estimation can be correctly performed using the rule table 1132. Therefore, robust intention estimation can be performed on various texts.

(11) For any text, of which the result of the intention estimation output based on the statistical model 1131 is erroneous and the result of the intention estimation output based on the statistical model for evaluation 1240 is correct, the data correction unit 1260 notifies the in-vehicle device 200 that output in the past a voice signal representing the text of the text as a newly understood text (steps S4230 to S4250 in FIG. 9). Consequently, any text, of which use of the statistical model 1131, i.e., updated version of the statistical model for evaluation 1240, enables the intention estimation unit 1120 to perform intention estimation correctly unlike the previous version (i.e., the statistical model for evaluation 1240), can be demonstrated to the user who made a speech corresponding to such text in the past. That is, the improvement of the function of the intention estimation unit 1120 can be appealed in an understandable way and simply. For instance, the user can feel that the improvement is directed to him and can have a sense of intimacy and a feeling of reliance toward the in-vehicle device, which leads to more comfortable use of the in-vehicle device.

(12) The relay server 1000 includes intention importance tables that describe a correct answer intention, an error intention estimation result, and degree of disadvantage, which represents magnitude of disadvantage the user suffers if the error intention estimation result is output, indicating the relationships among them, that is, priority basic information 1270 including information about topic intention importance 1271 and slot intention importance 1272, and a priority setting unit hat sets a priority based on the magnitude of disadvantage with reference to these intention importance tables (steps S4007, S4008, and S4014 in FIG. 10).

As a result, the greater the degree of disadvantage is, the higher the priority is set, so that the user seldom receives a serious disadvantage. That is, the convenience to users can be increased.

(13) The intention estimation result includes a function estimation result, that is, topic, and a variable estimation result, that is, slot. The priority basic information 1270 includes a first intention importance table corresponding to topic error, that is, topic intention importance 1271 and a second intention importance table corresponding to slot error, that is, slot intention importance 1272.

The priority setting unit (steps S4006 to S4014 in FIG. 10) sets priority based on the magnitude of the disadvantage with reference to the topic intention importance 1271 if the topic is erroneous or with reference to the slot intention importance 1272 if the slot is erroneous.

This allows setting independent degrees of disadvantage for topic error and slot error, respectively, and enables priorities to be set in detail.

VARIATION EXAMPLE

The above-explained first embodiment may be modified as follows.

(1) In updating the multiplying factor (steps S4110 to S4160) shown in FIG. 11, either one of the step-up method and the step-down method is adopted. However, both of them may be used in combination. For instance, if the error data has a high priority than the opposite data (S4100:YES), the multiplying factor of the opposite data is decreased and in addition the multiplying factor of the error data may be increased. On the other hand, if the error data has a lower priority than the opposite data, the multiplying factor of training data may be unchanged.

Which one of the step-up method and the step-down method to use may be determined according to the method input in advance by the administration terminal 500. Also, which to use may be automatically determined or switched during data correction. For instance, in the initial stage of data correction, first the step-down method is used to decrease the multiplying factor of the training data. This correction method is intended to maintain the state in which the intention estimation of both the opposite data and the error data are correctly performed. If it is successful in performing the intention estimation of both the data correctly, the data correction is completed. However, a decrease in multiplying factor of certain training data may cause an error of the intention estimation result of the training data concerned. Only in this case, the correction according to the step-down method is stopped and the correction according to the step-up method is used instead. That is, multiplying factor is gradually increased so that the multiplying factor of one training data is increased with maintaining minimum multiplying factor that allows correct intention estimation while the intention estimation of the other training data is also correctly performed. This algorithm enables intention estimation to be performed at a high total correct rate with eliminating training data having specifically large multiplying factor.

(2) The relay server 1000 receives a voice signal from the in-vehicle device 200 and it transmits an estimation intention expression to the in-vehicle device 200. However, the in-vehicle device 200 may be replaced by a mobile phone or a computer. That is, the in-vehicle device 200 may be any terminal that includes a communication unit and a voice input unit and operates according to the estimation intention expression received from the relay server 1000.

(3) The relay server 1000 performs communication with the voice recognition server 300 and with the facility retrieval server 400 as necessary. However, the relay server 1000 may be configured to have at least one of the function of the voice recognition server 300 and the function of the facility retrieval server 400.

The in-vehicle device 200 and the relay server 1000 need not be separated units but may be integrated as one unit.

In the present embodiment, the system is configured to perform the service of the facility retrieval by a server other than the relay server. The system may also be configured to include one or more servers that provide other services such as music or web retrieval (browsing). The system may also be configured not to connect with any server other than the relay server.

(4) The relay server 1000 is configured to receive voice signals from the in-vehicle device 200. However, it may be configured to receive texts. That is, the in-vehicle device 200 may include either a voice recognition unit or a text input unit.

(5) In the evaluation of the statistical model for evaluation 1240, the data correction unit 1260 requires that all the three acceptance criteria be satisfied for acceptance (step S4040). However, the data correction unit 1260 may be configured to require only two or more of the acceptance criteria be satisfied or at least one of the acceptance criteria be satisfied for acceptance.

Among the acceptance criteria in (A), (B), and (C) explained in the first embodiment, "correct answer (incorrect answer) rate" is calculating by a basic approach of dividing a correct answer number (incorrect answer number) by the number of evaluation data. In addition to this, a value reflecting a priority of evaluation data may be calculated. For instance, as the "correct answer (incorrect answer) rate", use may be made of a value obtained by dividing the sum of the priorities of the evaluation data giving correct answers (incorrect answers) by the sum of the priorities of all the pieces of evaluation data. Alternatively, a configuration may be adopted in which the magnitude of priority is divided into several stages, such as low (0 to 0.3), medium (0.3 to 0.7), and high (0.7 to 1.0), and "correct answer (incorrect answer) rate" and "correct answer (incorrect answer) number" are calculated for each evaluation data at each stage of priority to set separate reference values which are used for judging acceptance for respective stages.

(6) The operator operates the correct judgment unit 1280 through the administration terminal 500 to set a correct flag and a correct intention expression at the user log 1180. However, the relay server 1000 may be configured to have a second intention estimation model that is different from the intention estimation model 1130 to allow the correct flag and the correct intention expression to be set using the second intention estimation model.

(7) The evaluation unit 1230 uses the training data group 1200 as the evaluation data 1210. However, data that is unrelated to the training data group 1200 may be used as the evaluation data 1210. That is, regardless of whether the training unit 1220 used it in training, a combination of a plurality of texts and respective correct intention expressions of the texts may be used as the evaluation data 1210.

(8) The evaluation criteria of the statistical model for evaluation 1240, that is, criteria used when judgment of acceptance (step S4050 in FIG. 9) is performed by the data correction unit 1260 may be more alleviated, the more the number of times of data correction is increased. For instance, the number of the conditions A to C that are satisfied may be decreased or the predetermined rate in the conditions A to C may be decreased so that the conditions can be easily satisfied.

(9) The communication unit 1080 is not necessarily present in the in-vehicle device 200. Instead, a communication function of other communication equipment may be used.

(10) The evaluation based on the statistical model for evaluation 1240 by the data correction unit 1260 may be performed with reflecting priority. For instance, when the number of correct intention expressions obtained, priority of 0.0~1.0 may be added instead of equally adding 1. This enables the correct answer/incorrect answer of data with high priority to be calculated so that importance in judgment of acceptance is increased.

(11) In the first embodiment, multi-dimensional vectors are used for extracting opposite data from the training data group 1200. However, an experimental method may be used for this purpose. Specifically, attention is paid to pieces of training data in order and only the piece of the data to which attention is paid is removed from the training data group 1200 to create the statistical model for evaluation 1240 and then the intention estimation of error data is executed. If the result of the intention estimation of error data provides a correct answer, it is determined that the removed piece or pieces of the training data are opposite data. This method has an advantage that it gives evidence of extraction of the opposite data and that it can be also used in extracting opposite data.

(12) The intention estimation model 1130 includes the statistical model 1131 and the rule table 1132. However, the intention estimation model 1130 may include only the statistical model 1131. In this case, the processing in step S4164 in FIG. 11 may be omitted or the data may be removed from the training data group 1200 instead of moving the data to the rule table.

(13) In step S4220 in FIG. 9, the data correction unit 1260 adds all the records of the additional training data group 1202 to the basic training data group 1201. However, records having multiplying factors smaller than the predetermined value need not be added to the basic training data group 1201. For instance, records having a multiplying factor of less than 0.2 may be deleted from the additional training data group 1202 instead of being added to the basic training data group 1201.

(14) Data correction unit 1260 need not reflect priority of the training data having the same text as the existing text in determining priority of the additional training data group 1202. That is, in FIG. 10, after executing the step S4007 and the step S4008, the process proceeds to step S4013 and step S4014 and take the read importance as priority as it is.

(15) The rule table 1132 is explained on the assumption that some pieces of the training data for which intention estimation is not performed correctly are automatically stored at the rule table 1132. However, the rule table 1132 may include data that is added by a human in addition to those pieces of data that are automatically stored. In addition, a method in which the operator reviews the data selected from the training data and adds the reviewed data to the rule table 1132 after editing the string of characters and/or correct intention expression may be adaptable.

(16) The topic intention importance 1271 is determined using a pair of correct intention expression and error intention expression. However, the topic intention importance 1271 may be determined by a method in which topic intention importance is uniquely determined only from correct intention expressions or only from error intention expressions.

(17) In the above-mentioned embodiment, the action of step S4005 is configured to proceed to step S4006 only if the read-in correct flag is "incorrect answer". However, actually, if the read correct flag is "correct answer", it is desirable that the state in which intention estimation is performed correctly continues. To verify this state, it is necessary that data of which the read correct flag is "correct answer" is also added to the additional training data. For this purpose, the branching condition in step S4005 may be changed so that the process transitions to step S4006 if the read-in correct flag is any of "correct answer" or "incorrect answer".

Variation Example 1

In the above-mentioned embodiment, the operator operates the correct judgment unit 1280 through the administration terminal 500 to attach a correct flag to the user log 1180. However, the correct judgment unit 1280 may be configured to attach a correct flag to the user log 1180 by some means other than the operation by the operator.

If the intention estimation unit 1120 transmits the estimation intention expression output from the statistical model 1131 to the in-vehicle device 200, the in-vehicle device 200 acts according to the received estimation intention expression. On this occasion, the user of the in-vehicle device 200 may behave as indicated in any one of A to D below if the action of the in-vehicle device 20 is different from his own intention.

(A) The user cancels the function of the in-vehicle device executed by the received estimation intention expression.

(B) Immediately after a function is executed according to the received estimation intention expression, the user executes the function originally intended by him through the operation input unit 1030.

(C) The user speaks once again the same speech to input it to the voice input unit 1020.

(D) The user speaks a different expression of a text to input it into the voice input unit 1020 to have the same intention as that of the text executed.

For instance, the different expression or wording can be detected from a plurality of user's speeches by measuring various values such as the number of matches of string of words and a distance of the words in the multi-dimensional vector space upon conversion.

The in-vehicle device 200 starts action according to the estimation intention expression received from the relay server 1000 and at the same time records the inputs from the voice input unit 1020 and the operation input unit 1030 (hereafter, referred to as "action log") for a predetermined period of time, for instance, 30 seconds and then transmits the action log to the relay server 1000. The communication unit 1110 that received the action log of the relay server 1000 outputs the action to the correct judgment unit 1280. The correct judgment unit 1280 analyzes the action log and if it estimates any of the actions A to D above, it sets incorrect answer at the correct flag and if it estimates none of the actions A to D, it sets correct answer at the correct flag.

The variation example 1 provides the following operations and advantageous effects.

(1) The relay server 1000 includes a communication unit 1110 that performs transmission/reception of information to/from the in-vehicle device 200 having the voice input unit 1020 and the operation input unit 1030 that detects respective inputs based on the voice production and input operation by the user, the intention estimation unit 1120 that outputs a result of intention estimation on the input text based on the statistical model 1131, and the correct judgment unit 1280 that judges whether the result of the intention estimation by the intention estimation unit 1120 is true or false. The communication unit 1110 transmits the result of the intention estimation output from the intention estimation unit 1120 to the in-vehicle device 200 and at the same time receives the input information based on the inputs detected by the voice input unit 1020 and the operation input unit 1030 from the in-vehicle device 200 within a predetermined period of time from receipt of the result of the intention estimation. The correct judgment unit 1280 judges whether the result of the intention estimation by the intention estimation unit 1120 is true or false based on the input information received by the communication unit 1110.

Thus, the correct judgment unit 1280 is configured to attach the correct flag to the user log and this enables loads on the operator to be alleviated.

The variation example 1 may be modified as follows.

Respective user operation logs for cases in which the results of the intention estimation of voice recognition are correct and erroneous, respectively, are prepared in advance. Supposing the Markov model in which the state of the user and the equipment transition stochastically, the probability that each user may perform an action in each state and the probability that a transition will occur between states are modeled in advance. This Markov model is subjected to learning from the user operation logs for the case in which the result of the intention estimation is correct and for the case in which the result of the intention estimation is erroneous. Evaluation is made as to which one of the Markov models will generate the order of actions actually performed by the user in a higher probability. Depending on whether the model showing a higher probability is the model for the case in which the result of the intention estimation is correct or the model for the case in which the result of the intention estimation is errouneous, the correct flag may be set to correct answer or incorrect answer accordingly.

Second Embodiment

A second embodiment of the intention estimation system according to the present invention is explained with reference to FIGS. 13 to 16. In the following explanation, the same components as those in the first embodiment are assigned the same reference signs and explanation is focused mainly on differences between the first embodiment and the second embodiment. What is not explained specifically is the same as in the first embodiment. The present embodiment differs from the first embodiment mainly in the method of determining priority.

Configuration

The configurations and actions of the in-vehicle device 200, the voice recognition server 300, the facility retrieval server 400, the administration terminal 500 in the second embodiment are the same as those in the first embodiment. The configuration of the relay server 1000 differs from that of the relay server 1000 according to the first embodiment. In the second embodiment, the relay server 1000 includes, in addition to the corresponding components of the first embodiment, a speech frequency point data 3000, an equipment/user data 3100, and a point table 3200. This difference causes the data correction unit 1260 to act differently from its action in the first embodiment. The data correction unit 1260 updates the speech frequency point data 3000, the equipment/user data 3100, and the point table 3200. The data correction unit 1260 determines priority using the speech frequency point data 3000, the equipment/user data 3100, and the point table 3200.

The speech frequency point data 3000 is a database that includes the same number of records as the number of types of texts that is received by the relay server 1000 from the voice recognition server 300. That is, each record has a text that is different from the text of any other record. An example of the speech frequency data 3000 is shown in FIG. 13. One (1) record of the speech frequency point data 3000 includes a text, a number of times in which the text is spoken, detailed information, and a point calculated from the detailed information and the equipment/user data 3100. The detailed information includes an equipment ID of the in-vehicle device 200 that outputs the voice signal corresponding to the text included in the same record, a user ID of the in-vehicle device 200, and time and date at which the voice signal is received.

The equipment/user data 3100 is a database that includes the same number of records as the number of the voice recognition servers 300 with which the relay server 1000 has thus far communicated. That is, information about one in-vehicle device 200 is stored at one record. An example of the equipment/user data 3100 is shown in FIG. 14. One record of the equipment/user data 3100 includes an equipment ID of the in-vehicle 200, a user ID of the user who uses the in-vehicle device 200, a number of times in which a voice signal is transmitted from the in-vehicle device 200 to the relay server 1000 for each month, a last utilization day, an first utilization day, and an emphasis flag that indicates that the in-vehicle device 200 is important.

If the communication unit 1110 of the relay server 1000 receives a voice signal from the in-vehicle device 200, the communication unit 1110 transfers the terminal ID and the user ID attached to the voice signal to the data correction unit 1260. The data correction unit 1260 updates the utilization frequency and last utilization day of the equipment/user data 3100. If the transferred equipment ID and user ID are recorded in none of the records at the equipment/user data 3100, a new record is created and the day of processing is recorded in the service utilization start day of the created record. An emphasis flag is attached by the operation by the operator through the administration terminal 500.

The point table 3200 shows relationship between the priority and the point described at the speech frequency point data 3000. An example of the point table 3200 is shown in FIG. 15. In the example shown in FIG. 15, priorities ranging from the maximum of 1.0 to 0.1 at a pitch of 0.1 and respective minimum points corresponding to the priorities are described. For instance, if the point is 15000, which is less than 17000 and 14000 or more, corresponds to a priority of 0.8.

Action

If the communication unit 1110 of the relay server 1000 receives a text from the voice recognition server 300, the communication unit 1110 transfers the text to the intention estimation unit 1120 and the data correction unit 1260. The data correction unit 1260 retrieves a text that matches the transferred text at the speech frequency data 3000 and increases the speech frequency data of the matching record by 1. The data correction unit 1260 refers to the equipment/user data 3100 and plug in the utilization frequency, the last utilization day, the first utilization day, and the emphasis flag of the record having the equipment ID corresponding to the transferred text for a predetermined calculation formula to calculate a point. The data correction unit 1260 adds the calculated point to the point of the record that includes the transferred text at the speech frequency data 3000.

The calculation formula for calculating a point, which is to perform weighing based on the utilization frequency, the last utilization day, the first utilization day, and the emphasis flag, is configured, for instance, to increase the point more, the higher the utilization frequency is, the fewer days have elapsed from the last utilization day, or the more days have elapsed from the first utilization day, in the presence of the emphasis flag. It is assumed, for instance, "A" represents a utilization frequency, "B" represents a number of days elapsed from a last utilization day, "C" represents a number of days elapsed from an first utilization day, "work" represents a number of days from the start of operation of the relay server 1000, and "D" represents an emphasis flag. Then, a point P is represented by the following formula (1).

$$P = A/10 + 1/B + C/\text{work} + D \qquad (1)$$

In the formula (1) above, D is set to a predetermined value, for instance, 5, if the emphasis flag is present, or D is set to 0 (zero) if no emphasis flag is present.

Subroutine for Creating Additional Training Data

Figure 16:
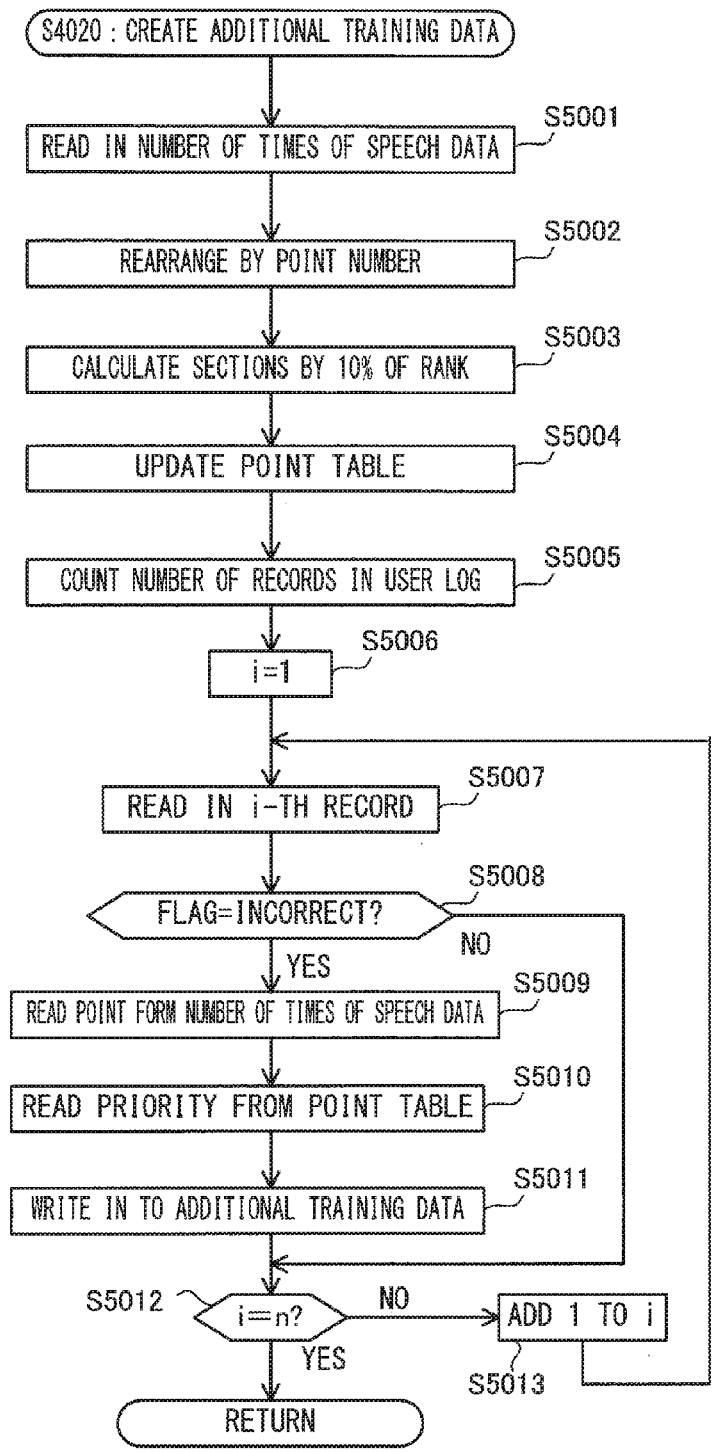
FIG. 16 is a flowchart illustrating replacement of the subroutine shown in FIG. 10 in the second embodiment.

The program illustrated in the flowchart of FIG. 16 indicates a procedure executed by the data correction unit 1260 in the second embodiment in place of the subroutine in the first embodiment illustrated in FIG. 10.

In step S5001, the data correction unit 1260 reads in the speech frequency data 3000 and then the process proceeds to step S5002.

In step S5002, the data correction unit 1260 checks all the points described in the speech frequency data 3000 and rearranges the speech frequency data 3000 in a descending order by point. That is, by the rearrangement, the leading record has a maximum point of the speech frequency data 3000 and the last record has a minimum point of the speech frequency data 3000. Then, the process proceeds to step S5003.

In step S5003, the data correction unit 1260, based on the total record number, which is known, of the speech frequency data 3000, calculates points that represent borders of groups of rearranged records divided at intervals of 10%. For instance, the data correction unit 1260 calculates a point that is a border between the top 10% group and a next 10% group. Then, the process proceeds to step S5004.

In step S5004, the data correction unit 1260 records the point calculated in step S5003 at the point table 3200 to update the point table 3200. In the example of the point table 3200 shown in FIG. 15, the left column, that is, priorities of 1.0, 0.9 and so on are unchanged whereas the right column, that is, border points are updated. Then, the process proceeds to step S5005.

In step S5005, the data correction unit 1260 reads in the user log 1180 and stores the total record number of the user log 1180, which is defined to be n. The total record number n is used later in step S5012. Then the process proceeds to step S5006.

In step S5006, the data correction unit 1260 plugs in 1 for the variable i and the process proceeds to step S5007.

In step S5007, the data correction unit 1260 reads in a part of the i-th record in the user log 1180, that is, a text and a correct flag. The process proceeds to step S5008.

In step S5008, the data correction unit 1260 judges whether the read-in correct flag is "incorrect answer". If it judges that the read-in correct flag is "incorrect answer", the process proceeds to step S5009. If it judges that the read-in correct flag is "correct answer" or "rule", the process proceeds to step S5011.

In step S5009, the data correction unit 1260 refers to the speech frequency data 3000 to read the point of the record that includes the read-in text. For instance, in the example in which the speech frequency data is the one that is shown in FIG. 13, if the read-in text is "peripheral convenience store", the data correction unit 1260 reads "23456" as the point. Then, the process proceeds to step S5010.

In step S5010, data correction unit 1260 refers to the point table 3200 and reads out a priority that corresponds to the point read in step S5009. For instance, in the example in which the point table 3200 is the one that is shown in FIG. 15, if the read point is "23456", which is larger than 21000, the data correction unit 1260 reads out a priority of "1.0". Then, the process proceeds to step S5011.

In step S5011, the data correction unit 1260 writes in the text of the i-th record in the user log 1180, the correct intention expression, the priority read out in step S5010, and the initial value of multiplying factor being set to 1 in a new record of the additional training data group 1202. Then, the process proceeds to step S5012.

In step S5012, the data correction unit 1260 judges whether the variable i is the same as the total record number n in the user log 1180. If the data correction unit 1260 judges that the variable i is the same as n, it terminates the flowchart shown in FIG. 16 and the process proceeds to step S4030 in FIG. 9. If the data correction unit 1260 judges that the variable i differs from n, that is, the variable i is less than n, the process proceeds to step S5013.

In step S5013, the data correction unit 1260 adds 1 to the variable i and the process returns to step S5007.

According to the second embodiment, the following operations and advantageous effects can be obtained.

(1) The text included in the training data group 1200 is created at the voice recognition server 300 based on the voice signal transmitted from the in-vehicle device 200 that includes the voice input unit 1020. The relay server 1000 includes a priority setting unit that sets priority of the training data group 1200 based on the frequency of the text created at the voice recognition server 300 based on the input information from the user received by the communication unit 1110, that is, the data correction unit 1260.

This configuration enables the data correction unit 1260 to change the multiplying factor so that a text that is received by the relay server 1000 at a higher frequency is given a higher priority to make it possible to perform intention estimation correctly. Consequently, the higher the frequency at which the text is received is, the more correctly the intention estimation of the text is performed. That is, intention estimation of the words the user speaks at high frequencies is performed correctly, which improves convenience to users.

(2) The data correction unit 1260 sets the priority of the training data group 1200 based on at least one of A to D below.

(A) Preset importance of the in-vehicle device 200, that is, emphasis flag of the equipment/user data 3100.

(B) Frequency at which the in-vehicle device 200 transmits information, that is, utilization frequency of the equipment/user data 3100.

(C) Elapsed time from the last transmission of the information by the in-vehicle device 200, that is, number of days elapsed calculated from the last utilization day of the equipment/user data 3100.

(D) Elapsed time from the first transmission of information by the in-vehicle device 200, that is, number of days elapsed calculated from the first utilization day of the equipment/user data 3100.

A to D above have the following advantages.

Use of the emphasis flag as shown in A above enables the intention estimation of the speech voice input into the in-vehicle device 200, which is judged by the operator to be important for the system and attached emphasis flag, to be performed correctly with ease. That is, regardless of utilization frequency and utilization term and so on, priority can be given to any in-vehicle device 200 by the operation by the operator.

Use of the utilization frequency as shown in B above enables the priority to be given to the speech of the user who uses the system more frequently.

Use of the elapsed time from the last transmission as shown in C above enables the priority to be given to the speech of the user who uses the system more frequently in the same manner as the utilization frequency is used since it is supposed that the shorter the elapsed time is, the higher the utilization frequency is.

Use of the elapsed time from the first utilization day as shown in D above enables priority to be given to the speech of the user who uses the system for a longer period of time.

VARIATION EXAMPLE

The above-explained embodiment may be modified as follows.

(1) In the emphasis flag of the equipment/user data 3100, the emphasis flag may be attached to the user of the in-vehicle device 200 instead of the in-vehicle device 200. That is, whether to set the emphasis flag may be determined depending on whether the user ID is identical to the preset user ID.

Even if the in-vehicle device 200 transmits no user ID, the user can be estimated by various methods. Use is made of, for instance, a method in which a nickname input by the user is transmitted in place of the user ID, a method in which user information of a smartphone that is connected in use to the in-vehicle device 200 is used, or a method in which the voice of the user is stored at the in-vehicle device or the relay server in advance and based on the stored voice the user is estimated using the voice of the user spoken upon voice recognition.

(2) In the second embodiment, priority is calculated using all of the utilization frequency, the number of days elapsed from the last utilization, the number of days elapsed from the first utilization day, and the emphasis flag, according to the formula (1) above. However, use of at least one of them may be sufficient for calculation.

(3) In the second embodiment, priority is set to a higher value, the higher the utilization frequency is, the smaller the number of days elapsed from the last utilization, or the larger the number of days elapsed from the first utilization day is. However, priority may be set to a higher value, the lower the utilization frequency is, the larger the number of days elapsed from the last utilization, or the smaller the number of days elapsed from the first utilization day is. These configurations enable users who use the service less frequently or users who are beginners to have a motivation to use the service continuously.

Alternatively, the relationships between high and low utilization frequencies and between large and small points may be changed for each user ID.

(4) It is configured that a result of the action in step S5008, the process proceeds to step S5009 only if the read-in correct flag is "incorrect answer". However, actually, it is desirable that the state in which intention estimation of the data of "correct answer" continues to be performed correctly and to verify this, it is necessary to add the data of "correct answer" to the additional training data. For this purpose, the branching condition in S5008 may be changed so that the process transitions to S5009 if the correct flag is any one of "correct answer" and "incorrect answer".

The above-mentioned embodiments and variation examples may be combined in any fashion.

In the above description, various embodiments and variation examples are explained. However, the present invention is not limited to them. Other aspects conceivable within the scope of the technical concept of the present invention may be encompassed by the present invention.

The above described embodiments and variation examples enable training of the intention estimation device using logs of a plurality of user's in their natural language to increase the user's convenience.

What is claimed is:

1. An intention estimation device comprising:
a processor; and
a memory connected to the processor, and storing a first training data group including a plurality of pieces of training data each being constituted by a text and a correct intention expression correlated with each other, and a second training data group including the plurality of pieces of training data in the first training data group and a plurality of pieces of training data not included in the first training data group,
wherein the memory further stores instructions that, when executed by the processor, causes to processor to execute:
a model creation unit that creates a plurality of statistical models that, when text is input, estimate an intention of the input text using the training data and outputs an intention estimation result, and the statistical models include a first statistical model is created by the model creation unit using the first training data group and a second statistical model is created by the model creation unit using the second training data group,
an error data extraction unit that extracts training data from the second training data group corresponding to text of which an intention estimation result output based on the first statistical model is correct and an intention estimation result output based on the second statistical model is erroneous, as error data;
an opposite data extraction unit that extracts, from the second training data group, training data that is a cause for an intention estimation result of the error data output based on the second statistical model becoming erroneous as opposite data; and
a data correction unit that performs correction of the second training data group so that an influence of the error data or an influence of the opposite data on creation of the statistical models is changed.

2. The intention estimation device according to claim 1, wherein the training data further includes a priority indicating an index of importance of the text in intention estimation, and the data correction unit compares a priority of the error data with a priority of the opposite data and performs correction of the second training data group based on a result of the comparison.

3. The intention estimation device according to claim 2, wherein the data correction unit, when the priority of the error data is higher than the priority of the opposite data, performs correction of the second training data group to increase an influence of the error data or decrease an influence of the opposite data in creating the statistical model.

4. The intention estimation device according to claim 2, wherein the data correction unit, when the priority of the error data is lower than the priority of the opposite data, performs correction of the second training data group to decrease an influence of the error data or increase an influence of the opposite data in creating the statistical model.

5. The intention estimation device according to claim 2, wherein the memory further stores priority basic information that includes information relating to an intention importance table indicating relations among a correct intention, an error intention estimation result, and a degree of disadvantage, which represents a magnitude of disadvantage a user receives when the error intention estimation result is output, and wherein the memory further stores instructions that, when executed by the processor, causes to processor to execute:

a priority setting unit that refers to the intention importance table and sets the priority based on the magnitude of the degree of disadvantage.

6. The intention estimation device according to claim 5, wherein the intention estimation result includes a function estimation result and a variable estimation result, the intention importance table includes a first intention importance table corresponding to an error of the function estimation result and a second intention importance table corresponding to an error of the variable estimation result, and the priority setting unit, when the function estimation result is erroneous, refers to the first intention importance table or when variable estimation result is erroneous, refers to the second intention importance table, and sets the priority based on the magnitude of the degree of disadvantage.

7. The intention estimation device according to of claim 2, further comprising:

a communication unit that performs transmission/reception of information to/from a terminal that includes an input unit that detects an input based on a behavior of a user and receives, from the terminal, input information based on the input detected by the input unit; and a priority setting unit that sets the priority based on a frequency in which a text is created based on input information received by the communication unit.

8. An intention estimation device according to claim 2, further comprising:

a communication unit that performs transmission/reception of information to/from a terminal including an input unit that detects an input based on a behavior of a user and receives, from the terminal, input information based on the input detected by the input unit, and wherein the memory further stores instructions that, when executed by the processor, causes to processor to execute:

a priority setting unit that determines the priority based on at least one of (A) a preset importance of the terminal, (B) a preset importance of the user, (C) a frequency at which the terminal transmits the information, (D) an elapsed time from last transmission of the information by the terminal, and (E) an elapsed time from initial transmission of the information.

9. The intention estimation device according to claim 1, wherein at least one of the first training data and the second training data further includes a multiplying factor that represents a weight of the text in creating the statistical models by the model creation unit, and the data correction unit performs correction of the second training data group by changing the multiplying factor of the error data and the opposite data.

10. The intention estimation device according to claim 9, wherein the memory further stores a rule table in which a text and a correct intention correlated with the text are stored, wherein the memory further stores instructions that, when executed by the processor, causes to processor to execute:

an intention estimation unit that outputs an intention estimation result for an input text based on the first statistical model or the rule table, wherein the data correction unit transfers training data that is included in the second training data group and has the multiplying factor outside a predetermined range to the rule table, and the intention estimation unit, when the input text is included in the rule table, outputs the intention estimation result based on the rule table without using the first statistical model.

11. The intention estimation device according to claim 1, wherein the memory further stores instructions that, when executed by the processor, causes to processor to execute:

a model evaluation unit that judges whether the second statistical model satisfies predetermined criteria based on an intention estimation result obtained by inputting any text into the second statistical model, wherein the data correction unit, when evaluation unit judges that the second statistical model satisfies the predetermined criteria, performs correction of the second training data group, and the model creation unit repeats creation of the second statistical model using the second training data group corrected by the data correction unit.

12. The intention estimation device according to claim 1, wherein the second training data group includes the first training data group and additional training data created based on information transmitted from a terminal that includes an input unit.

13. The intention estimation device according to claim 1, further comprising:

a communication unit that performs transmission/reception of information to/from a terminal that includes an input unit that detects an input based on a behavior of a user, wherein the memory further stores instructions that, when executed by the processor, causes to processor to execute:

an intention estimation unit that outputs an intention estimation result for the input text based on the first statistical model; and a correct judgment unit that judges whether the intention estimation result output by the intention estimation unit is true or false, wherein the communication unit transmits the intention estimation result output from the intention estimation unit to the terminal and receives from the terminal input information based on an input detected by the input unit within a predetermined period of time from receipt of the intention estimation result, and the correct judgment unit judges whether the intention estimation result output by the intention estimation unit based on the input information received by the communication unit is true or false.

14. The intention estimation device according to claim 1, wherein the memory further stores instructions that, when executed by the processor, causes to processor to execute:

a notification unit that notifies a text of which an intention estimation result output based on the first statistical model is erroneous and an intention estimation result output based on the second statistical model is correct.

15. An intention estimation system comprising:

an intention estimation device connected to a network and which includes:

a processor; and a memory connected to the processor, and storing a first training data group including a plurality of pieces of training data each being constituted by a text and a correct intention expression correlated with each other, and a second training data group including the plurality of pieces of training data in the first training data group and a plurality of pieces of training data not included in the first training data group, and the memory further stores instructions that, when executed by the processor, causes to processor to execute:

a model creation unit that creates a plurality of statistical models that, when text is input, estimate an intention of the input text using the training data and outputs an intention estimation result, and the statistical models include a first statistical model is created by the model creation unit using the first training data group and a second statistical model is created by the model creation unit using the second training data group, an error data extraction unit that extracts training data from the second training data group corresponding to text of which an intention estimation result output based on the first statistical model is correct and an intention estimation result output based on the second statistical model is erroneous, as error data;

an opposite data extraction unit that extracts, from the second training data group, training data that is a cause for an intention estimation result of the error data output based on the second statistical model becoming erroneous as opposite data; and a data correction unit that performs correction of the second training data group so that an influence of the error data or an influence of the opposite data on creation of the statistical models is changed; and a terminal connectable to the intention estimation device via the network, wherein the terminal includes:

an input unit that receives an input by a user; a transmission unit that transmits the input that is input to the input unit by the user to the intention estimation device; and an execution unit that receives an intention estimation result on the input by the user performed by the intention estimation device and acts according to the intention estimation result.

\* \* \* \* \*